US007221785B2

(12) United States Patent
Curry et al.

(10) Patent No.: US 7,221,785 B2
(45) Date of Patent: May 22, 2007

(54) METHOD AND SYSTEM FOR MEASURING A MOLECULAR ARRAY BACKGROUND SIGNAL FROM A CONTINUOUS BACKGROUND REGION OF SPECIFIED SIZE

(75) Inventors: Bo U. Curry, Redwood City, CA (US); Herbert F. Cattell, Mountain View, CA (US); Srinka Ghosh, San Francisco, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 519 days.

(21) Appl. No.: 10/153,394

(22) Filed: May 21, 2002

(65) Prior Publication Data

US 2003/0219151 A1    Nov. 27, 2003

(51) Int. Cl.
*G06K 9/00* (2006.01)
*G06K 9/40* (2006.01)
*G01N 33/48* (2006.01)

(52) U.S. Cl. .................. 382/129; 382/274; 702/19

(58) Field of Classification Search ............... 382/162; 345/591; 435/6
See application file for complete search history.

(56) References Cited

U.S. PATENT DOCUMENTS

| | | | |
|---|---|---|---|
| 5,599,695 A | 2/1997 | Pease et al. | |
| 5,753,788 A | 5/1998 | Fodor et al. | |
| 6,153,038 A * | 11/2000 | Brooker | 156/230 |
| 6,171,797 B1 | 1/2001 | Perbost | |
| 6,180,351 B1 | 1/2001 | Cattell | |
| 6,232,072 B1 | 5/2001 | Fisher | |
| 6,242,266 B1 | 6/2001 | Schleifer et al. | |
| 6,323,043 B1 | 11/2001 | Caren et al. | |
| 6,329,143 B1 | 12/2001 | Stryer et al. | |
| 6,344,316 B1 * | 2/2002 | Lockhart et al. | 435/6 |
| 6,355,423 B1 | 3/2002 | Rothberg et al. | |
| 6,429,875 B1 * | 8/2002 | Pettigrew et al. | 345/591 |
| 6,445,816 B1 * | 9/2002 | Pettigrew | 382/162 |
| 6,731,781 B1 * | 5/2004 | Shams et al. | 382/129 |
| 6,905,827 B2 * | 6/2005 | Wohlgemuth et al. | 435/6 |
| 2001/0018183 A1 * | 8/2001 | Bao et al. | 435/6 |
| 2002/0086289 A1 * | 7/2002 | Straus | 435/6 |
| 2003/0105195 A1 * | 6/2003 | Holcomb et al. | 524/102 |

(Continued)

FOREIGN PATENT DOCUMENTS

EP        1 162 572        12/2001

*Primary Examiner*—Ishrat Sherau
*Assistant Examiner*—Utpal Shah

(57) ABSTRACT

A method and system for estimating the background signal over an arbitrarily-sized region of a scanned image of a molecular array, including a background region surrounding the ROI corresponding to the feature. A bit mask is generated, based on a molecular-array, feature-based data set that includes pixel-based intensities and a list of features, including feature coordinates and feature ROI radii, to indicate those pixels in the scanned image of the molecular array corresponding to background, and those pixels in the scanned image of the molecular array corresponding to features and ROIs. An integrated intensity for a background region of arbitrary size and shape can be efficiently determined by selecting pixels within the background region that are indicated to be background pixels in the bit mask. By selecting background anuli of sufficient size to overlap with the background anuli of neighboring features, a relatively continuous function of background-signal-verusus-position can be obtained across the surface of a molecular array in order to examine non-local, background-signal-related phenomena.

23 Claims, 15 Drawing Sheets

U.S. PATENT DOCUMENTS

2003/0113004 A1* 6/2003 Kim et al. .................. 382/128
2004/0047499 A1* 3/2004 Shams ....................... 382/129
2005/0031178 A1* 2/2005 Park .......................... 382/128

* cited by examiner

| 47552 | 37716 | 33125 | 29014 | 30655 | 35414 | 52272 | 47632 | 6520 |
|---|---|---|---|---|---|---|---|---|
| 54628 | 49837 | 46350 | 47800 | 50963 | 25677 | 9830 | 12614 | 62750 |
| 51308 | 6815 | 56333 | 4800 | 35178 | 29803 | 22404 | 7627 | 4806 |
| 9107 | 57602 | 10562 | 11891 | 51133 | 11202 | 10005 | 5187 | 63860 |
| 35111 | 35486 | 10819 | 54505 | 30199 | 53762 | 21377 | 52396 | 4811 |
| 37802 | 39104 | 41705 | 24310 | 27616 | 31177 | 44307 | 45502 | 5136 |
| 38112 | 42107 | 54306 | 10011 | 61975 | 57802 | 47634 | 49608 | 9713 |
| 14989 | 15191 | 16531 | 17898 | 46812 | 10187 | 61397 | 15890 | 101 |
| 55466 | 15811 | 43681 | 59981 | 65535 | 51676 | 24681 | 35123 | 139 |

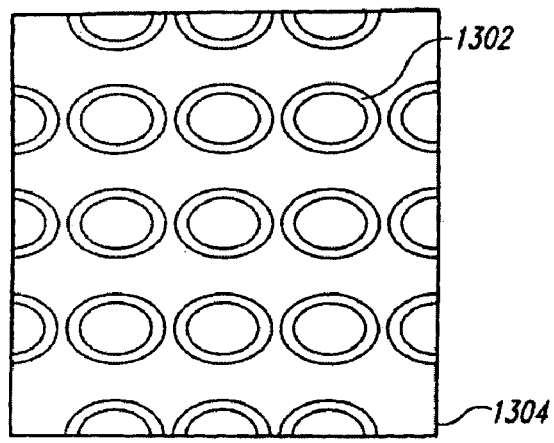
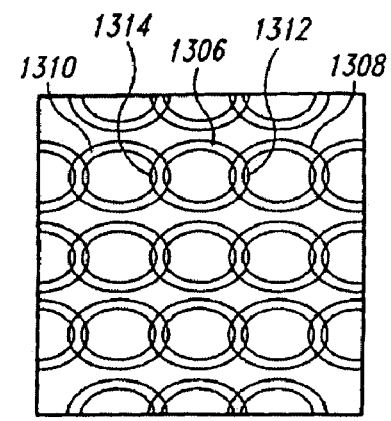
*Fig. 13A*  *Fig. 13B*
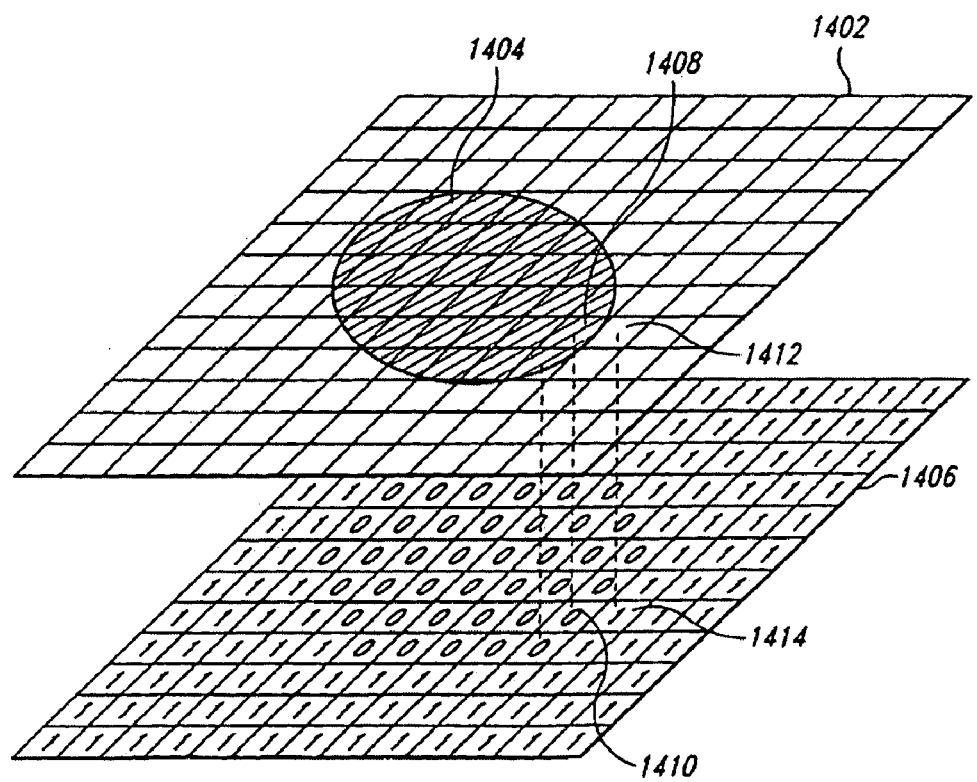
*Fig. 14*

METHOD AND SYSTEM FOR MEASURING A MOLECULAR ARRAY BACKGROUND SIGNAL FROM A CONTINUOUS BACKGROUND REGION OF SPECIFIED SIZE

TECHNICAL FIELD

The present invention relates to the analysis of data obtained by scanning molecular arrays and, in particular, to a method and system for determining a background-signal intensity for a specified feature or group of features of a molecular array by computing a background-signal intensity, or another similar metric, over an arbitrarily sized background region surrounding the feature or group of features.

BACKGROUND OF THE INVENTION

Nothing in the following discussion is admitted to be prior art unless specifically identified as "prior art." The present invention is related to processing of data scanned from arrays. Array technologies have gained prominence in biological research and are likely to become important and widely used diagnostic tools in the healthcare industry. Currently, molecular-array techniques are most often used to determine the concentrations of particular nucleic-acid polymers in complex sample solutions. Molecular-array-based analytical techniques are not, however, restricted to analysis of nucleic acid solutions, but may be employed to analyze complex solutions of any type of molecule that can be optically or radiometrically scanned and that can bind with high specificity to complementary molecules synthesized within, or bound to, discrete features on the surface of an array. Because arrays are widely used for analysis of nucleic acid samples, the following background information on arrays is introduced in the context of analysis of nucleic acid solutions following a brief background of nucleic acid chemistry.

Deoxyribonucleic acid ("DNA") and ribonucleic acid ("RNA") are linear polymers, each synthesized from four different types of subunit molecules. The subunit molecules for DNA include: (1) deoxy-adenosine, abbreviated "A," a purine nucleoside; (2) deoxy-thymidine, abbreviated "T," a pyrimidine nucleoside; (3) deoxy-cytosine, abbreviated "C," a pyrimidine nucleoside; and (4) deoxy-guanosine, abbreviated "G," a purine nucleoside. The subunit molecules for RNA include: (1) adenosine, abbreviated "A," a purine nucleoside; (2) uracil, abbreviated "U," a pyrimidine nucleoside; (3) cytosine, abbreviated "C," a pyrimidine nucleoside; and (4) guanosine, abbreviated "G," a purine nucleoside. FIG. 1 illustrates a short DNA polymer 100, called an oligomer, composed of the following subunits: (1) deoxy-adenosine 102; (2) deoxy-thymidine 104; (3) deoxy-cytosine 106; and (4) deoxy-guanosine 108. When phosphorylated, subunits of DNA and RNA molecules are called "nucleotides" and are linked together through phosphodiester bonds 110–115 to form DNA and RNA polymers. A linear DNA molecule, such as the oligomer shown in FIG. 1, has a 5' end 118 and a 3' end 120. A DNA polymer can be chemically characterized by writing, in sequence from the 5' end to the 3' end, the single letter abbreviations for the nucleotide subunits that together compose the DNA polymer. For example, the oligomer 100 shown in FIG. 1 can be chemically represented as "ATCG." A DNA nucleotide comprises a purine or pyrimidine base (e.g. adenine 122 of the deoxy-adenylate nucleotide 102), a deoxy-ribose sugar (e.g. deoxy-ribose 124 of the deoxy-adenylate nucleotide 102), and a phosphate group (e.g. phosphate 126) that links one nucleotide to another nucleotide in the DNA polymer. In RNA polymers, the nucleotides contain ribose sugars rather than deoxy-ribose sugars. In ribose, a hydroxyl group takes the place of the 2' hydrogen 128 in a DNA nucleotide. RNA polymers contain uridine nucleosides rather than the deoxy-thymidine nucleosides contained in DNA. The pyrimidine base uracil lacks a methyl group (130 in FIG. 1) contained in the pyrimidine base thymine of deoxy-thymidine.

The DNA polymers that contain the organization information for living organisms occur in the nuclei of cells in pairs, forming double-stranded DNA helixes. One polymer of the pair is laid out in a 5' to 3' direction, and the other polymer of the pair is laid out in a 3' to 5' direction. The two DNA polymers in a double-stranded DNA helix are therefore described as being anti-parallel. The two DNA polymers, or strands, within a double-stranded DNA helix are bound to each other through attractive forces including hydrophobic interactions between stacked purine and pyrimidine bases and hydrogen bonding between purine and pyrimidine bases, the attractive forces emphasized by conformational constraints of DNA polymers. Because of a number of chemical and topographic constraints, double-stranded DNA helices are most stable when deoxy-adenylate subunits of one strand hydrogen bond to deoxy-thymidylate subunits of the other strand, and deoxy-guanylate subunits of one strand hydrogen bond to corresponding deoxy-cytidilate subunits of the other strand.

FIGS. 2A–B illustrates the hydrogen bonding between the purine and pyrimidine bases of two anti-parallel DNA strands. FIG. 2A shows hydrogen bonding between adenine and thymine bases of corresponding adenosine and thymidine subunits, and FIG. 2B shows hydrogen bonding between guanine and cytosine bases of corresponding guanosine and cytosine subunits. Note that there are two hydrogen bonds 202 and 203 in the adenine/thymine base pair, and three hydrogen bonds 204–206 in the guanosine/cytosine base pair, as a result of which GC base pairs contribute greater thermodynamic stability to DNA duplexes than AT base pairs. AT and GC base pairs, illustrated in FIGS. 2A–B, are known as Watson-Crick ("WC") base pairs.

Two DNA strands linked together by hydrogen bonds forms the familiar helix structure of a double-stranded DNA helix. FIG. 3 illustrates a short section of a DNA double helix 300 comprising a first strand 302 and a second, anti-parallel strand 304. The ribbon-like strands in FIG. 3 represent the deoxyribose and phosphate backbones of the two anti-parallel strands, with hydrogen-bonding purine and pyrimidine base pairs, such as base pair 306, interconnecting the two strands. Deoxy-guanylate subunits of one strand are generally paired with deoxy-cytidilate subunits from the other strand, and deoxy-thymidilate subunits in one strand are generally paired with deoxy-adenylate subunits from the other strand. However, non-WC base pairings may occur within double-stranded DNA.

Double-stranded DNA may be denatured, or converted into single stranded DNA, by changing the ionic strength of the solution containing the double-stranded DNA or by raising the temperature of the solution. Single-stranded DNA polymers may be renatured, or converted back into DNA duplexes, by reversing the denaturing conditions, for example by lowering the temperature of the solution containing complementary single-stranded DNA polymers. During renaturing or hybridization, complementary bases of anti-parallel DNA strands form WC base pairs in a cooperative fashion, leading to reannealing of the DNA duplex.

Strictly A-T and G-C complementarity between anti-parallel polymers leads to the greatest thermodynamic stability, but partial complementarity including non-WC base pairing may also occur to produce relatively stable associations between partially-complementary polymers. In general, the longer the regions of consecutive WC base pairing between two nucleic acid polymers, the greater the stability of hybridization between the two polymers under renaturing conditions.

The ability to denature and renature double-stranded DNA has led to the development of many extremely powerful and discriminating assay technologies for identifying the presence of DNA and RNA polymers having particular base sequences or containing particular base subsequences within complex mixtures of different nucleic acid polymers, other biopolymers, and inorganic and organic chemical compounds. One such methodology is the array-based hybridization assay. FIGS. 4–7 illustrate the principle of the array-based hybridization assay. An array (402 in FIG. 4) comprises a substrate upon which a regular pattern of features is prepared by various manufacturing processes. The array 402 in FIG. 4, and in subsequent FIGS. 5–7, has a grid-like 2-dimensional pattern of square features, such as feature 404 shown in the upper left-hand corner of the array. Each feature of the array contains a large number of identical oligonucleotides covalently bound to the surface of the feature. These bound oligonucleotides are known as probes. In general, chemically distinct probes are bound to the different features of an array, so that each feature corresponds to a particular nucleotide sequence. In FIGS. 4–6, the principle of array-based hybridization assays is illustrated with respect to the single feature 404 to which a number of identical probes 405–409 are bound. In practice, each feature of the array contains a high density of such probes but, for the sake of clarity, only a subset of these are shown in FIGS. 4–6.

Once an array has been prepared, the array may be exposed to a sample solution of target DNA or RNA molecules (410–413 in FIG. 4) labeled with fluorophores, chemiluminescent compounds, or radioactive atoms 415–418. Labeled target DNA or RNA hybridizes through base pairing interactions to the complementary probe DNA, synthesized on the surface of the array. FIG. 5 shows a number of such target molecules 502–504 hybridized to complementary probes 505–507, which are in turn bound to the surface of the array 402. Targets, such as labeled DNA molecules 508 and 509, that do not contains nucleotide sequences complementary to any of the probes bound to array surface do not hybridize to generate stable duplexes and, as a result, tend to remain in solution. The sample solution is then rinsed from the surface of the array, washing away any unbound-labeled DNA molecules. In other embodiments, unlabeled target sample is allowed to hybridize with the array first. Typically, such a target sample has been modified with a chemical moiety that will react with a second chemical moiety in subsequent steps. Then, either before or after a wash step, a solution containing the second chemical moiety bound to a label is reacted with the target on the array. After washing, the array is ready for scanning. Biotin and avidin represent an example of a pair of chemical moieties that can be utilized for such steps.

Finally, as shown in FIG. 6, the bound labeled DNA molecules are detected via optical or radiometric scanning. Optical scanning involves exciting labels of bound labeled DNA molecules with electromagnetic radiation of appropriate frequency and detecting fluorescent emissions from the labels, or detecting light emitted from chemiluminescent labels. When radioisotope labels are employed, radiometric scanning can be used to detect the signal emitted from the hybridized features. Additional types of signals are also possible, including electrical signals generated by electrical properties of bound target molecules, magnetic properties of bound target molecules, and other such physical properties of bound target molecules that can produce a detectable signal. Optical, radiometric, or other types of scanning produce an analog or digital representation of the array as shown in FIG. 7, with features to which labeled target molecules are hybridized similar to 706 optically or digitally differentiated from those features to which no labeled DNA molecules are bound. In other words, the analog or digital representation of a scanned array displays positive signals for features to which labeled DNA molecules are hybridized and displays negative features to which no, or an undetectably small number of, labeled DNA molecules are bound. Features displaying positive signals in the analog or digital representation indicate the presence of DNA molecules with complementary nucleotide sequences in the original sample solution. Moreover, the signal intensity produced by a feature is generally related to the amount of labeled DNA bound to the feature, in turn related to the concentration, in the sample to which the array was exposed, of labeled DNA complementary to the oligonucleotide within the feature.

Array-based hybridization techniques allow extremely complex solutions of DNA molecules to be analyzed in a single experiment. An array may contain from hundreds to tens of thousands of different oligonucleotide probes, allowing for the detection of a subset of complementary sequences from a complex pool of different target DNA or RNA polymers. In order to perform different sets of hybridization analyses, arrays containing different sets of bound oligonucleotides are manufactured by any of a number of complex manufacturing techniques. These techniques generally involve synthesizing the oligonucleotides within corresponding features of the array through a series of complex iterative synthetic steps.

One, two, or more than two data subsets within a data set can be obtained from a single molecular array by scanning the molecular array for one, two or more than two types of signals. Two or more data subsets can also be obtained by combining data from two different arrays. When optical scanning is used to detect fluorescent or chemiluminescent emission from chromophore labels, a first set of signals, or data subset, may be generated by scanning the molecular at a first optical wavelength, a second set of signals, or data subset, may be generated by scanning the molecular at a second optical wavelength, and additional sets of signals may be generated by scanning the molecular at additional optical wavelengths. Different signals may be obtained from a molecular array by radiometric scanning to detect radioactive emissions at one, two, or more than two different energy levels. Target molecules may be labeled with either a first chromophore that emits light at a first wavelength, or a second chromophore that emits light at a second wavelength. Following hybridization, the molecular array can be scanned at the first wavelength to detect target molecules, labeled with the first chromophore, hybridized to features of the molecular array, and can then be scanned at the second wavelength to detect target molecules, labeled with the second chromophore, hybridized to the features of the molecular array. In one common molecular array system, the first chromophore emits light at a red visible-light wavelength, and the second chromophore emits light at a green, visible-light wavelength. The data set obtained from scanning the molecular array at the red wavelength is referred to as the "red signal," and the data set obtained from scanning the molecular array at the green wavelength is referred to as the "green signal." While it is common to use one or two different chromophores, it is possible to use three, four, or more than four different chromophores and to scan a molecular array at three, four, or more than four wavelengths to produce three, four, or more than four data sets.

FIG. 8 shows a small region of a scanned image of a molecular array containing an image of a single feature. In FIG. 8, the small region of the scanned image comprises a grid, or matrix, of pixels, such as pixel 802. In FIG. 8, the magnitude of the signal scanned from the small region of the surface of a molecular array spatially corresponding to a particular pixel in the scanned image is indicated by a kind of gray scaling. Pixels corresponding to high-intensity signals, such as pixel 804, are darkly colored, while pixels having very low signal intensities, such as pixel 802, are not colored. The range of intermediate signal intensities is represented, in FIG. 8, by a generally decreasing density of crosshatch lines within a pixel. In FIG. 8, there is a generally disc-shaped region in the center of the region of the scanned image of the molecular array that contains a high proportion of high-intensity pixels. Outside of this central, disc-shaped region corresponding to a feature, the intensities of the pixels fall off relatively quickly, although pixels with intermediate intensities are found, infrequently, even toward the edges of the region of the scanned image, relatively distant from the obvious central, disc-shaped region of high-intensity pixels that corresponds to the feature.

In general, data sets collected from molecular arrays comprise an indexed set of numerical signal intensities associated with pixels. The pixel intensities range over the possible values for the size of the memory-storage unit employed to store the pixel intensities. In many current systems, a 16-bit word is employed to store the intensity value associated with each pixel, and a data set can be considered to be a 2-dimensional array of pixel-intensity values corresponding to the 2-dimensional array of pixels that together compose a scanned image of a molecular array.

FIG. 9 shows a 2-dimensional array of pixel-intensity values corresponding to a portion of the central, disc-shaped region corresponding to a feature in the region of a scanned image of a molecular array shown on FIG. 8. In FIG. 9, for example, pixel intensity 902 corresponds to pixel 806 in FIG. 8.

Features on the surface of a molecular array may have various different shapes and sizes, depending on the manufacturing process by which the molecular array is produced. In one important class of molecular arrays, features are tiny, disc-shaped regions on the surface of the molecular array produced by ink-jet-based application of probe molecules, or probe-molecular-precursors, to the surface of the molecular array substrate. FIG. 10 shows an idealized representation of a feature, such as the feature shown in FIG. 8, on a small section of the surface of a molecular array. FIG. 11 shows a graph of pixel-intensity values versus position along a line bisecting a feature in the scanned image of the feature. For example, the graph shown in FIG. 11 may be obtained by plotting the intensity values associated with pixels along lines 1002 or 1004 in FIG. 10. Consider a traversal of the pixels along line 1002 starting from point 1006 and ending at point 1008. In FIG. 11, points 1106 and 1108 along the horizontal axis correspond to positions 1006 and 1008 along line 1002 in FIG. 10. Initially, at positions well removed from the central, disc-shaped region of the feature in 1010, the scanned signal intensity is relatively low. As the central, disc-shaped region of the feature is approached, along line 1002, the pixels intensities remain at a fairly constant, background level up to point 1012, corresponding to point 1112 in FIG. 11. Between points 1012 and 1014, corresponding to points 1112 and 1114 in FIG. 11, the average intensity of pixels rapidly increases to a relatively high intensity level 1115 at a point 1014 coincident with the outer edge of the central, disc-shaped region of the feature. The intensity remains relatively high over the central, disc-shaped region of the feature 1116, and begins to fall off starting at point 1018, corresponding to point 1118 in FIG. 11, at the far side of the central, disc-shaped region of the feature. The intensity rapidly falls off with increasing distance from the central, disc-shaped region of the feature until again reaching a relatively constant, background level at point 1008, corresponding to point 1108 in FIG. 11. The exact shape of the pixel-intensity-versus-position graph, and the size and shape of the feature, are dependent on the particular type of molecular array and molecular-array substrate, chromophore or a radioisotope used to label target molecules, experimental conditions to which the molecular array is subjected, the molecular-array scanner used to scan a molecular array, and on data processing components of the molecular-array scanner and an associated computer that produce the scanned image and pixel-intensity data sets. For example, with some type of array manufacture processes or with different hybridization and washing protocols, the features may resemble donuts, or even more irregular blobs.

The background signal generated during scanning regions of the surface of a molecular array outside of the areas corresponding to features arises from many different sources, including contamination of the molecular-array surface by fluorescent or radioactively labeled or naturally radioactive compounds, fluorescence or radiation emission from the molecular-array substrate, dark signal generated by the photo detectors in the molecular-array scanner, and many other sources. When this background signal is measured on the portion of the array that is outside of the areas corresponding to a feature, it is often referred to as the "local" background signal.

An important part of molecular-array data processing is a determination of the background signal that needs to be subtracted from a feature. With appropriate background-subtraction, it is possible to distinguish low-signal features from no-signal features and to calculate accurate and reproducible log ratios between multi-channel and/or inter-array data. The sources of background signal that appear in the local background region may be identical to the sources of background signal that occur on the feature itself; that is, the signal represented in the local background region may be additive to the signal that arises from the specific labeled target hybridized to probes on that feature. In this case, it is appropriate to use the signal from the local background region as the best estimate of the background to subtract from that feature.

FIG. 12 illustrates a currently employed technique for measuring the local background signal for a feature. FIG. 12 corresponds to the small region of the scanned image of a molecular array shown on FIG. 8. Initial pixel-based coordinates for the center of the feature can be estimated from manufacturing data for the molecular array and from a number of scanned-image processing techniques. Using these initial pixel-based coordinates for the center of the feature, the integrated intensities of disc-shaped regions with increasing radii centered at those coordinates can be computed to determine, by a decrease in integrated intensities, the outer edge 1202 of the central, disc-shaped feature region. An intermediate region, in which the integrated pixel intensities rapidly fall off with increasing radius, corresponding to the regions in FIG. 11 between points 1112 and 1114 and between points 1118 and 1108, can be determined to provide the outer boundary 1204 of a region of interest ("ROI") surrounding and including the central, disc-shaped region of the feature. Finally, an annulus lying between the outer edge of the ROI 1204 and a somewhat arbitrary outer background circumference 1206 is considered to be the background region for the feature, and the integrated intensity of this background region 1208, divided by the area of the background region, is taken to be the background signal for the entire region comprising the feature region, feature ROI, and background annulus. Alternatively, the locations and sizes of feature regions may be known in advance of the image processing stage, based on array manufacturing data and other information, and so the ROI may not need to be determined by a method such as the method described above. Thus, a current technique for background signal estimation is based on a local method involving determining an integrated signal intensity for an annulus surrounding the ROI disc associated with a feature, and determining a background-signal intensity per image area. The estimated local background signal for a feature is the background-signal intensity per image area, and is subtracted from the normalized raw feature signal, to produce a background-subtracted feature signal. A feature-based data set includes background-subtracted data subset, for each signal scanned, comprising feature signals or raw feature signals.

Unfortunately, as the density of features placed on molecular-array substrates increases, the local background-signal estimation technique illustrated in FIG. 12 begins to fail. FIGS. 13A–B illustrate a problem with local background-signal estimation that arises with high feature densities. In FIG. 13A, the background annuli, for example background annulus 1302, surrounding features laid out in a grid-like pattern on a small region of a molecular array substrate 1304 are shown to be relatively well-spaced and discrete. However, in a higher-density molecular array, where the same features are more closely crowded together, as shown in FIG. 13B, the background annulus of one feature, for example, background annulus 1306, may overlap with the background annuli 1308 and 1310 of neighboring features and may, in addition, overlap 1312 and 1314 with the ROI or even the central, disc-shaped region of neighboring features. Overlap 1312 and 1314 of a background annulus 1306 with neighboring ROIs can significantly raise the background signal estimation above the true, non-feature and non-ROI background-signal intensity level. At certain feature densities, it may be possible to decrease the thickness of background annuli in order to prevent overlap, but background annuli cannot be arbitrarily decreased in size past a certain limit. There must be, for example, a minimum number of pixels within the background annulus in order to generate a statistically significant estimation of the intensity of pixels within the background region surrounding a feature. There is, in addition, another problem with the currently-employed local background-signal estimation technique illustrated in FIG. 12. As seen in FIG. 13A, the background annuli are discrete, so that the background signal estimated across features of a molecular array is not a continuous function of position with respect to the molecular array. Thus, it is difficult to use local backgrounds for estimating non-local background-related phenomena, such as background-signal gradients and other such phenomena. For these reasons, designers, manufacturers, and users of molecular arrays have recognized the need for a method for accurately determining an estimated background signal for densely packed features and for estimating background signal in a continuous fashion with respect to position on the surface of a molecular array.

SUMMARY OF THE INVENTION

One embodiment of the present invention provides a method and system for estimating the background signal over an arbitrarily-sized region of a scanned image of a molecular array, including a background region surrounding the ROI corresponding to the feature. A bit mask is generated, based on a molecular-array, feature-based data set that includes pixel-based intensities and a list of features, including feature coordinates and feature ROI radii, to indicate those pixels in the scanned image of the molecular array corresponding to background, and those pixels in the scanned image of the molecular array corresponding to features and ROIs. An integrated intensity for a background region of arbitrary size and shape can be efficiently determined by selecting pixels within the background region that are indicated to be background pixels in the bit mask. The background region of arbitrary size may have, for example, the form of an annulus containing disc-shaped holes corresponding to neighboring feature ROIs within the annular region. By selecting background annuli of sufficient size to overlap with the background annuli of neighboring features, a relatively continuous function of background-signal versus position can be obtained across the surface of a molecular array in order to examine non-local, background-signal-related phenomena.

In alternate embodiments, more complex feature, ROI, and background-region shapes may be used. For example, ellipses specified by major and minor axis may be employed rather than discs specified by radii. Alternatively, complex, irregular shapes based on pixel-intensities may be used. In all cases, designation of pixels as belonging to the background or to feature and feature ROIs via the bit mask can be used to computationally efficiently generate background-signal integrated intensities for regions of various sizes and shapes surrounding, or partly surrounding, features and feature ROIs. In yet another set of embodiments, methods other than bit-mask-based methods may be used to select pixels within a specified background region of a feature that do not also fall within ROIs of neighboring features.

BRIEF DESCRIPTION OF THE DRAWINGS

FIG. 9 shows a two-dimensional array of pixel-intensity values corresponding to a portion of the central, disc-shaped region corresponding to a feature in the region of a scanned image of a molecular array shown on FIG. 8.

FIGS. 13A–B illustrate a problem with local background-signal estimation that arises with high feature densities.

FIGS. 14 and 15 illustrate generation of a background mask which is subsequently used, in the described embodiment of the present convention, to distinguish background pixels from non-background pixels.

DETAILED DESCRIPTION OF THE INVENTION

Figure 1:
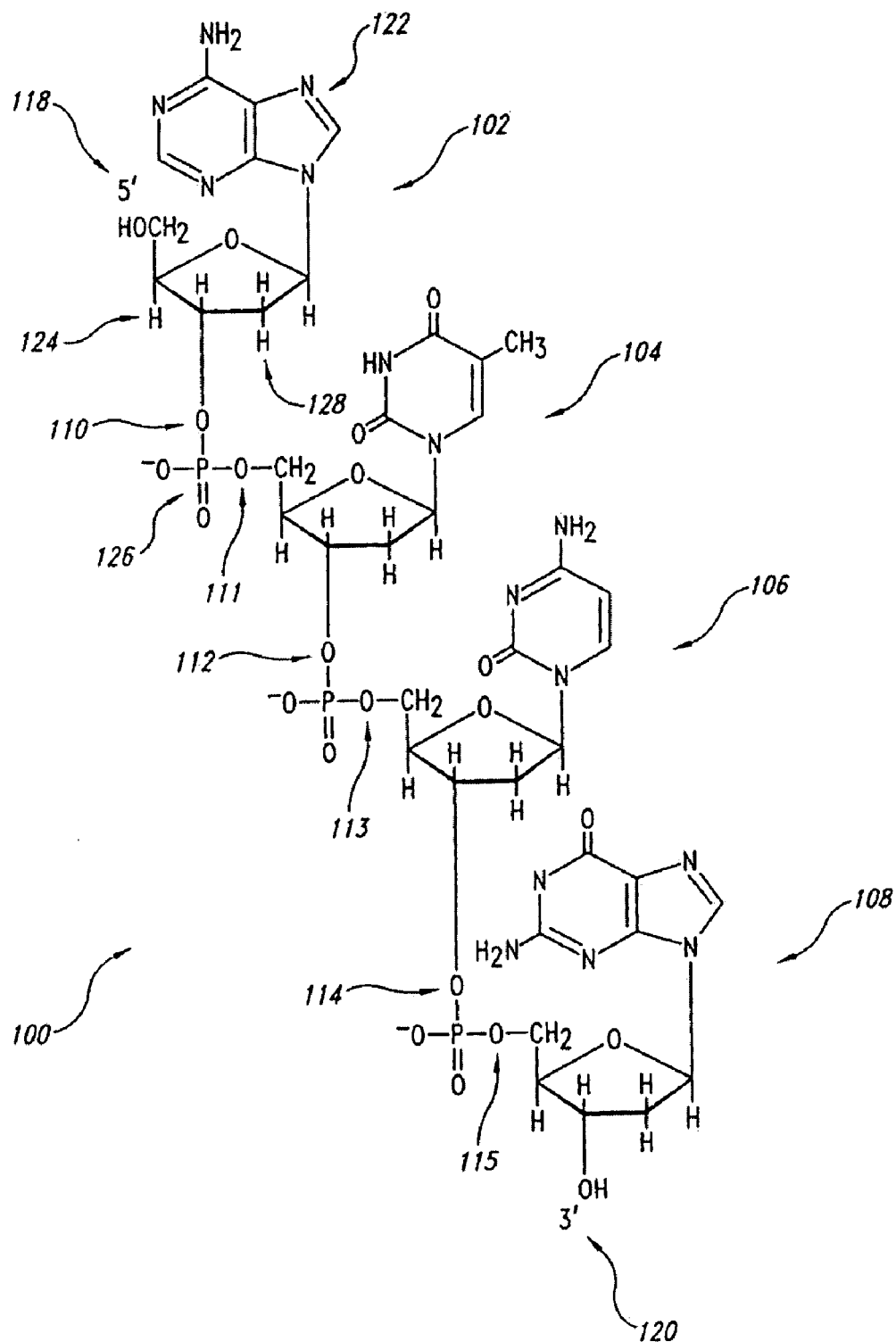
FIG. 1 illustrates a short DNA polymer.
Figure 2A:
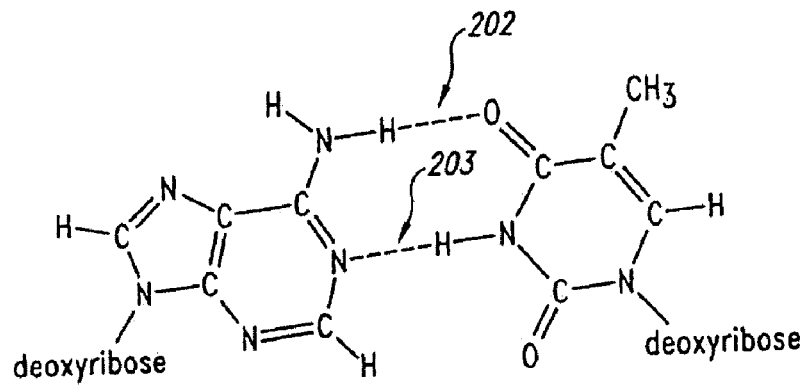
FIG. 2A shows hydrogen bonding between adenine and thymine bases of corresponding adenosine and thymidine subunits.
Figure 2B:
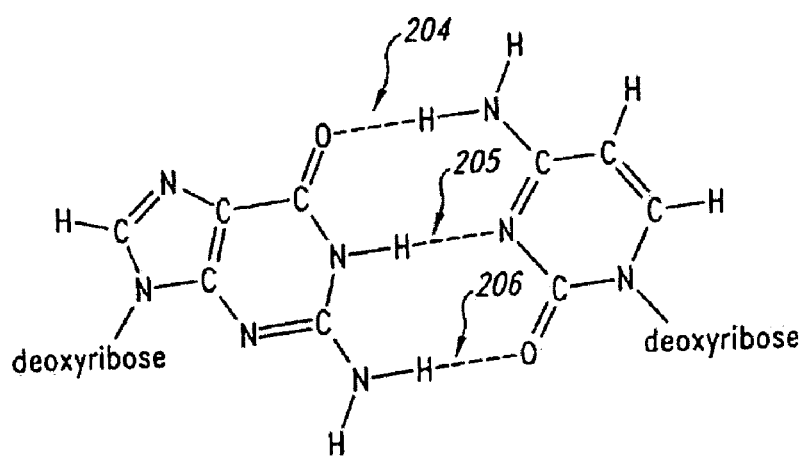
FIG. 2B shows hydrogen bonding between guanine and cytosine bases of corresponding guanosine and cytosine subunits.
Figure 3:
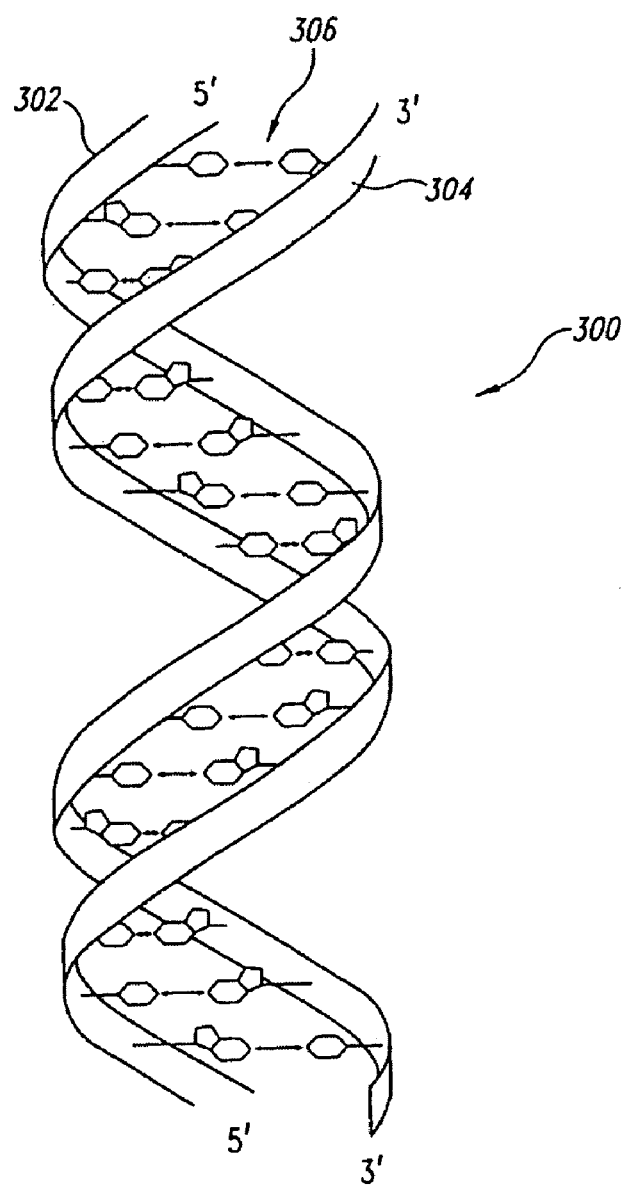
FIG. 3 illustrates a short section of a DNA double helix.
Figure 4:
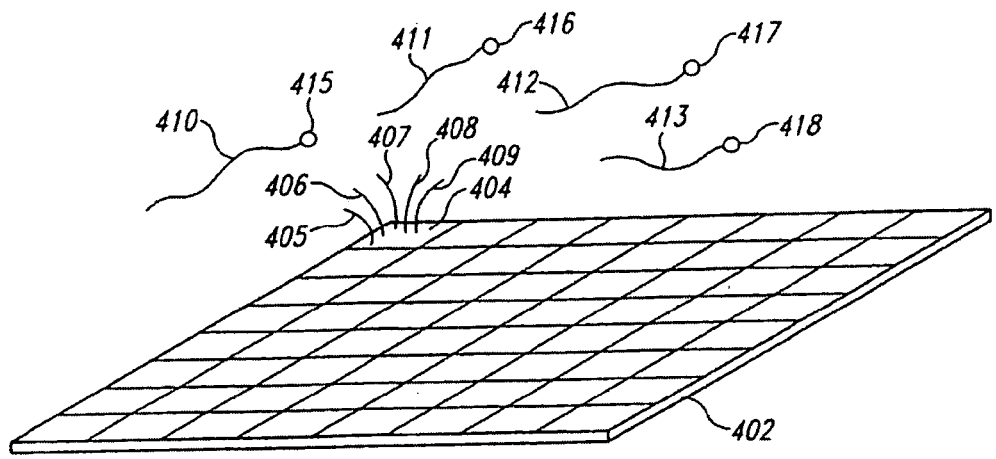
FIGS. 4–7 illustrate the principle of array-based hybridization assays.
Figure 5:
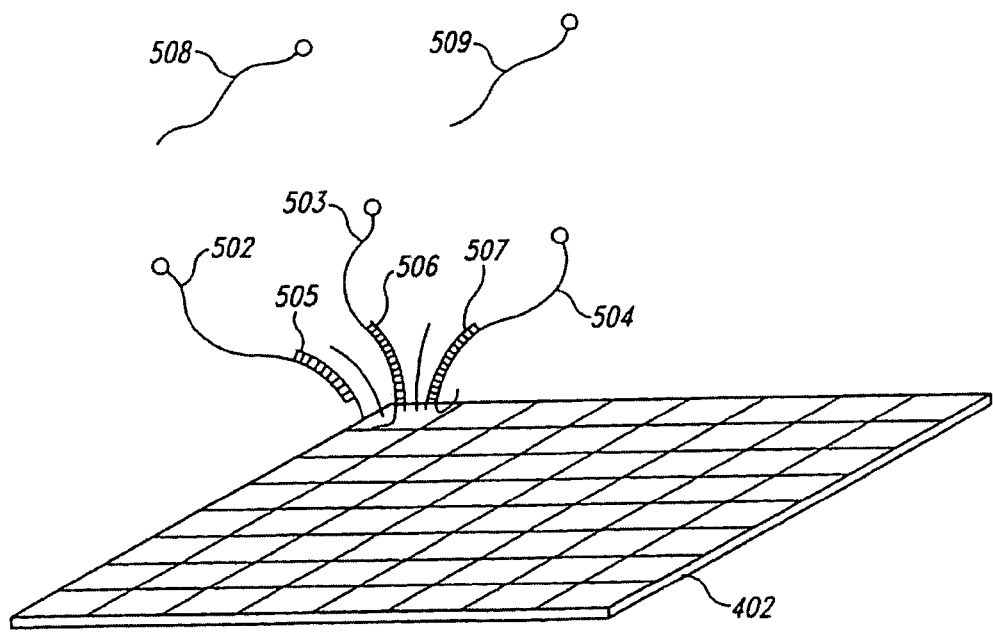
Figure 6:
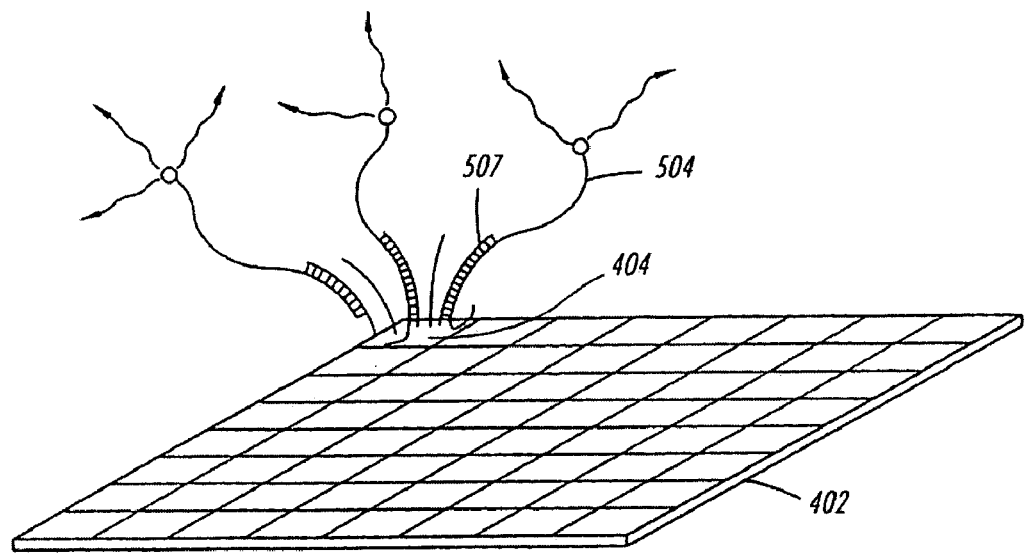
Figure 7:
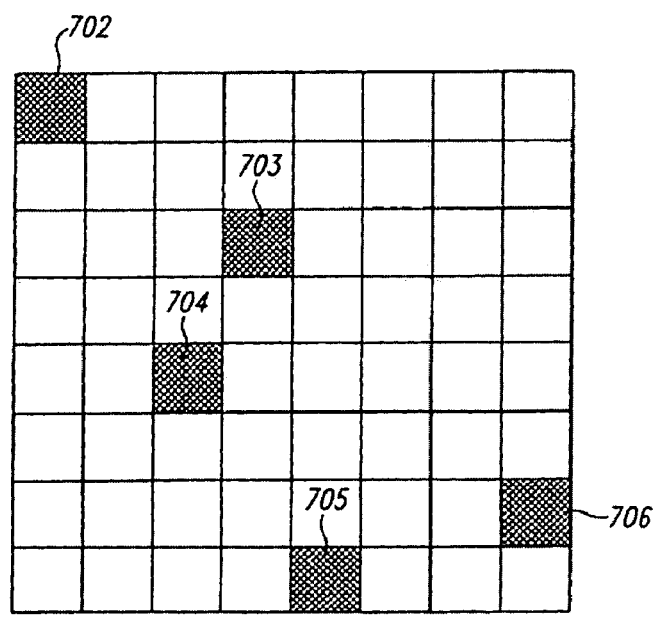
Figure 8:
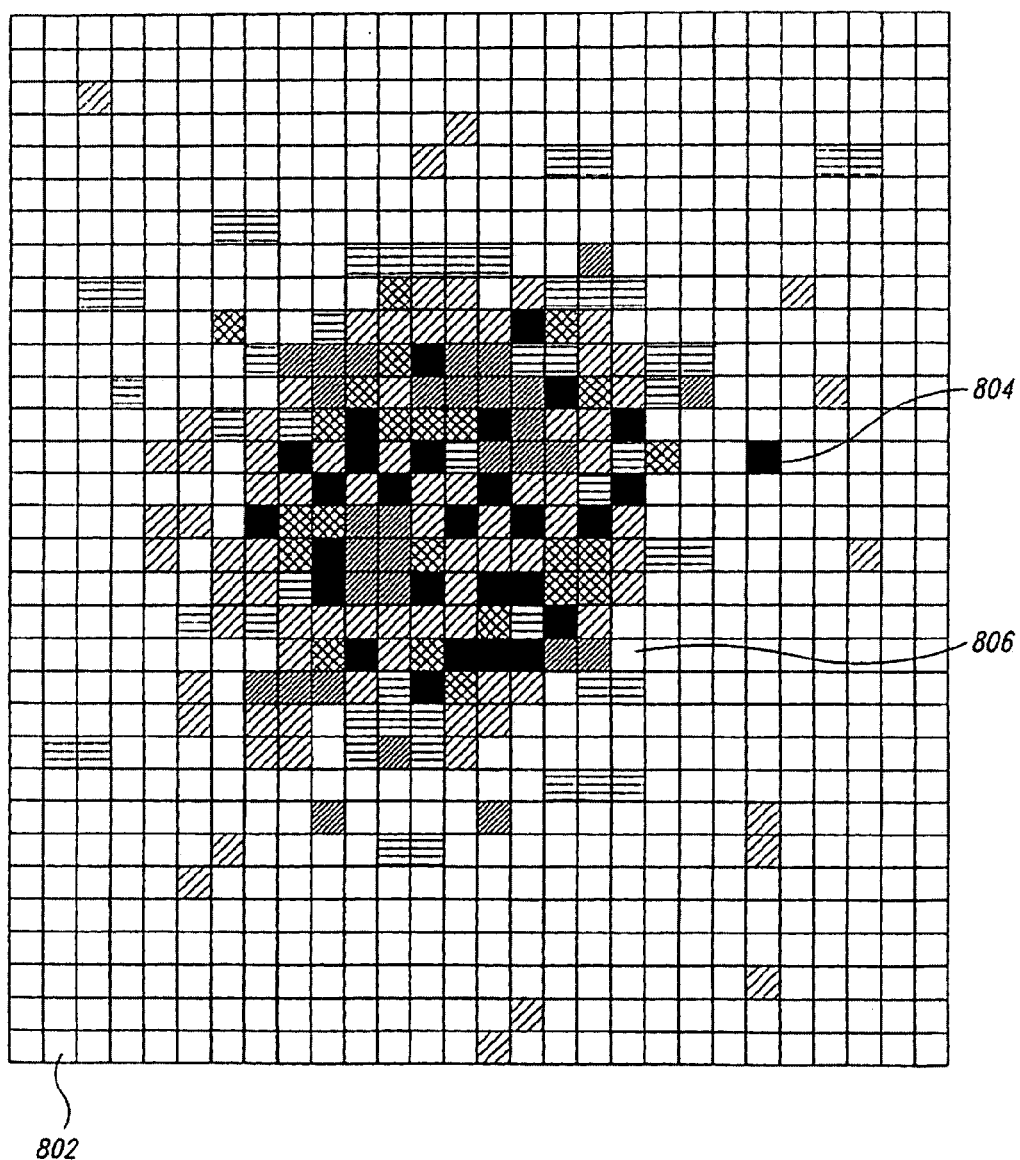
FIG. 8 shows a small region of a scanned image of a molecular array containing the image of a single feature.
Figure 10:
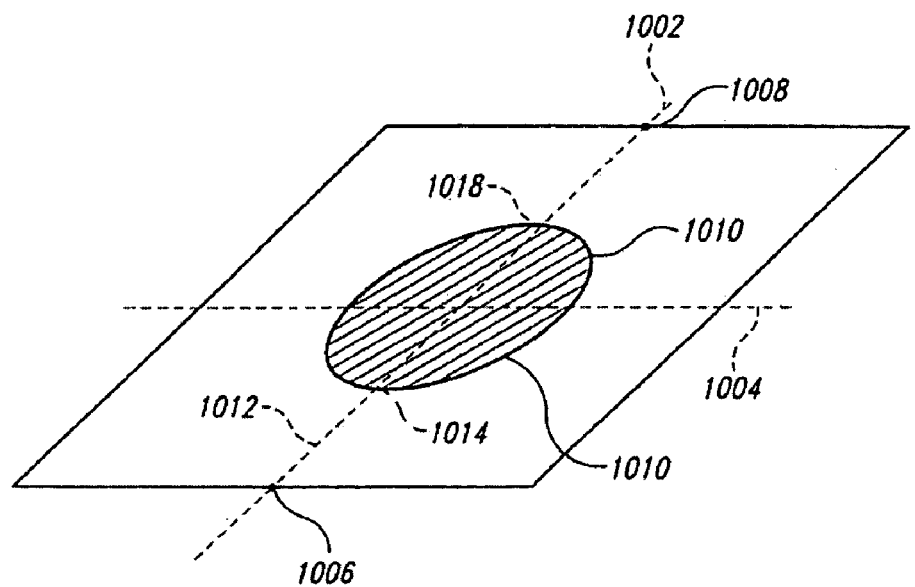
FIG. 10 shows an idealized representation of a feature, such as the feature shown in FIG. 8, on a small section of the surface of a molecular array.
Figure 11:
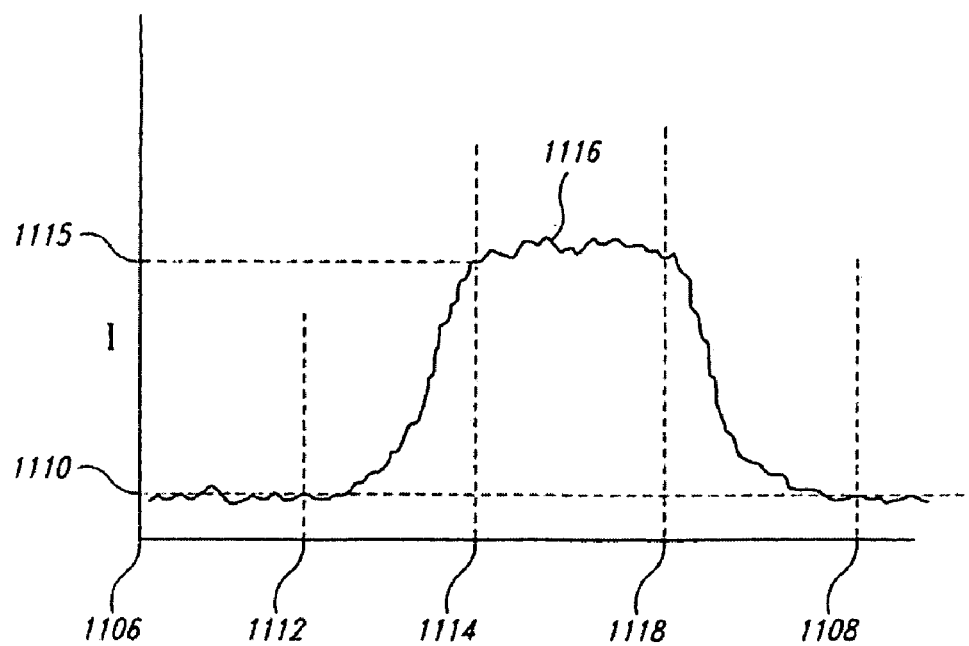
FIG. 11 shows a graph of pixel-intensity values versus position along a line bisecting a feature in the scanned image of the feature.
Figure 12:
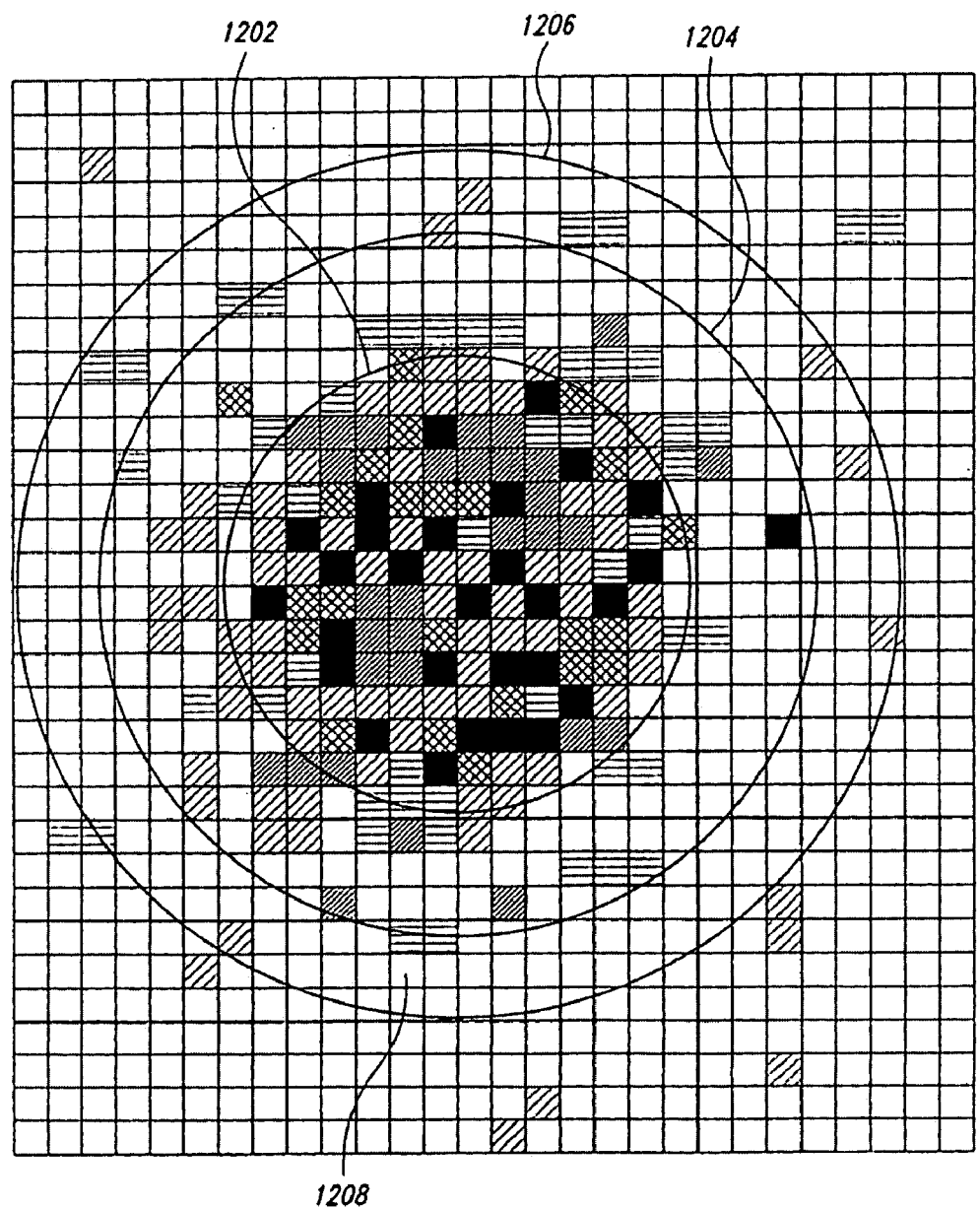
FIG. 12 illustrates a currently employed technique for measuring the background signal for a feature.

One embodiment on the present invention is directed to method and system for determining background signals for molecular array features based on arbitrarily specified background-region shapes and sizes. In an embodiment described below, background signals can be estimated for background annuli of arbitrary thicknesses surrounding disc-shaped molecular array features and molecular-array-feature ROIs. A background mask is generated to designate each pixel in the scanned image of the molecular array as belonging to the background or to a feature or feature ROI. This background mask can be used, in combination with parameters that specify the location, shape, and sizes of molecular array features and feature ROIs, to enumerate the pixels in an arbitrarily sized and shaped background surrounding the feature. The same technique can be used to calculate background-signal metrics for an arbitrarily shaped background region of arbitrary size and location within the scanned image of a molecular array.

In alternative embodiments, alternative computational methods may be used to select pixels within a specified background for one feature that do not also fall within ROIs of neighboring features. For example, rather than creating and storing a bit-mask indicating ROI and non-ROI pixels, when the ROIs are reasonably regularly shaped and located, and analytical model for ROI size, shape, and location may instead be stored, to allow on-the-fly calculation of the ROI pixels. The bit-mask technique is generally computationally efficient, as is the preferred embodiment for that reason, but the present invention is directed to the more general concept of specifying and using arbitrarily sized and shaped background regions around features. One embodiment of the present invention is described in three subsections that follow: (1) additional information about molecular arrays; (2) an overview of the method of one embodiment of the present invention, presented with reference to FIGS. 14–21; and (3) a C++-like pseudocode implementation of the embodiment.

Additional Information About Molecular Arrays

An array may include any one-, two- or three-dimensional arrangement of addressable regions, or features, each bearing a particular chemical moiety or moieties, such as biopolymers, associated with that region. Any given array substrate may carry one, two, or four or more arrays disposed on a front surface of the substrate. Depending upon the use, any or all of the arrays may be the same or different from one another and each may contain multiple spots or features. A typical array may contain more than ten, more than one hundred, more than one thousand, more ten thousand features, or even more than one hundred thousand features, in an area of less than 20 $cm^2$ or even less than 10 $cm^2$. For example, square features may have widths, or round feature may have diameters, in the range from a 10 μm to 1.0 cm. In other embodiments each feature may have a width or diameter in the range of 1.0 μm to 1.0 mm, usually 5.0 μm to 500 μm, and more usually 10 μm to 200 μm. Features other than round or square may have area ranges equivalent to that of circular features with the foregoing diameter ranges. At least some, or all, of the features may be of different compositions (for example, when any repeats of each feature composition are excluded the remaining features may account for at least 5%, 10%, or 20% of the total number of features). Interfeature areas are typically, but not necessarily, present. Interfeature areas generally do not carry probe molecules. Such interfeature areas typically are present where the arrays are formed by processes involving drop deposition of reagents, but may not be present when, for example, photolithographic array fabrication processes are used. When present, interfeature areas can be of various sizes and configurations.

Each array may cover an area of less than 100 $cm^2$, or even less than 50 $cm^2$, 10 $cm^2$ or 1 $cm^2$. In many embodiments, the substrate carrying the one or more arrays will be shaped generally as a rectangular solid having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm. Other shapes are possible, as well. With arrays that are read by detecting fluorescence, the substrate may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, a substrate may transmit at least 20%, or 50% (or even at least 70%, 90%, or 95%), of the illuminating light incident on the front as may be measured across the entire integrated spectrum of such illuminating light or alternatively at 532 nm or 633 nm.

Arrays can be fabricated using drop deposition from pulsejets of either polynucleotide precursor units (such as monomers) in the case of in situ fabrication, or the previously obtained polynucleotide. Such methods are described in detail in, for example, U.S. Pat. No. 6,242,266, U.S. Pat. No. 6,232,072, U.S. Pat. No. 6,180,351, U.S. Pat. No. 6,171,797, U.S. Pat. No. 6,323,043, U.S. patent application Ser. No. 09/302,898 filed Apr. 30, 1999 by Caren et al., and the references cited therein. Other drop deposition methods can be used for fabrication, as previously described herein. Also, instead of drop deposition methods, photolithographic array fabrication methods may be used such as described in U.S. Pat. No. 5,599,695, U.S. Pat. No. 5,753,788, and U.S. Pat. No. 6,329,143. Interfeature areas need not be present particularly when the arrays are made by photolithographic methods as described in those patents.

A molecular array is typically exposed to a sample including labeled target molecules, or, as mentioned above, to a sample including unlabeled target molecules followed by exposure to labeled molecules that bind to unlabeled target molecules bound to the array, and the array is then read. Reading of the array may be accomplished by illuminating the array and reading the location and intensity of resulting fluorescence at multiple regions on each feature of the array. For example, a scanner may be used for this purpose, which is similar to the AGILENT MICROARRAY SCANNER manufactured by Agilent Technologies, Palo Alto, Calif. Other suitable apparatus and methods are described in U.S. patent applications: Ser. No. 10/087,447 "Reading Dry Chemical Arrays Through The Substrate" by Corson et al., and Ser. No. 09/846,125 "Reading Multi-Featured Arrays" by Dorsel et al. However, arrays may be read by any other method or apparatus than the foregoing, with other reading methods including other optical techniques, such as detecting chemiluminescent or electroluminescent labels, or electrical techniques, for where each feature is provided with an electrode to detect hybridization at that feature in a manner disclosed in U.S. Pat. No. 6,251,685, U.S. Pat. No. 6,221,583 and elsewhere.

A result obtained from reading an array, followed by application of a method of the present invention, may be used in that form or may be further processed to generate a result such as that obtained by forming conclusions based on the pattern read from the array, such as whether or not a particular target sequence may have been present in the sample, or whether or not a pattern indicates a particular condition of an organism from which the sample came. A result of the reading, whether further processed or not, may be forwarded, such as by communication, to a remote location if desired, and received there for further use, such as for further processing. When one item is indicated as being remote from another, this is referenced that the two items are at least in different buildings, and may be at least one mile, ten miles, or at least one hundred miles apart. Communicating information references transmitting the data representing that information as electrical signals over a suitable communication channel, for example, over a private or public network. Forwarding an item refers to any means of getting the item from one location to the next, whether by physically transporting that item or, in the case of data, physically transporting a medium carrying the data or communicating the data.

As pointed out above, array-based assays can involve other types of biopolymers, synthetic polymers, and other types of chemical entities. A biopolymer is a polymer of one or more types of repeating units. Biopolymers are typically found in biological systems and particularly include polysaccharides, peptides, and polynucleotides, as well as their analogs such as those compounds composed of, or containing, amino acid analogs or non-amino-acid groups, or nucleotide analogs or non-nucleotide groups. This includes polynucleotides in which the conventional backbone has been replaced with a non-naturally occurring or synthetic backbone, and nucleic acids, or synthetic or naturally occurring nucleic-acid analogs, in which one or more of the conventional bases has been replaced with a natural or synthetic group capable of participating in Watson-Crick-type hydrogen bonding interactions. Polynucleotides include single or multiple-stranded configurations, where one or more of the strands may or may not be completely aligned with another. For example, a biopolymer includes DNA, RNA, oligonucleotides, and PNA and other polynucleotides as described in U.S. Pat. No. 5,948,902 and references cited therein, regardless of the source. An oligonucleotide is a nucleotide multimer of about 10 to 100 nucleotides in length, while a polynucleotide includes a nucleotide multimer having any number of nucleotides.

As an example of a non-nucleic-acid-based molecular array, protein antibodies may be attached to features of the array that would bind to soluble labeled antigens in a sample solution. Many other types of chemical assays may be facilitated by array technologies. For example, polysaccharides, glycoproteins, synthetic copolymers, including block copolymers, biopolymer-like polymers with synthetic or derivitized monomers or monomer linkages, and many other types of chemical or biochemical entities may serve as probe and target molecules for array-based analysis. A fundamental principle upon which arrays are based is that of specific recognition, by probe molecules affixed to the array, of target molecules, whether by sequence-mediated binding affinities, binding affinities based on conformational or topological properties of probe and target molecules, or binding affinities based on spatial distribution of electrical charge on the surfaces of target and probe molecules.

Scanning of a molecular array by an optical scanning device or radiometric scanning device generally produces a scanned image comprising a rectilinear grid of pixels, with each pixel having a corresponding signal intensity. These signal intensities are processed by an array-data-processing program that analyzes data scanned from an array to produce experimental or diagnostic results which are stored in a computer-readable medium, transferred to an intercommunicating entity via electronic signals, printed in a human-readable format, or otherwise made available for further use. Molecular array experiments can indicate precise gene-expression responses of organisms to drugs, other chemical and biological substances, environmental factors, and other effects. Molecular array experiments can also be used to diagnose disease, for gene sequencing, and for analytical chemistry. Processing of molecular-array data can produce detailed chemical and biological analyses, disease diagnoses, and other information that can be stored in a computer-readable medium, transferred to an intercommunicating entity via electronic signals, printed in a human-readable format, or otherwise made available for further use.

Overview of the Method of One Embodiment of the Present Invention

Figure 15:
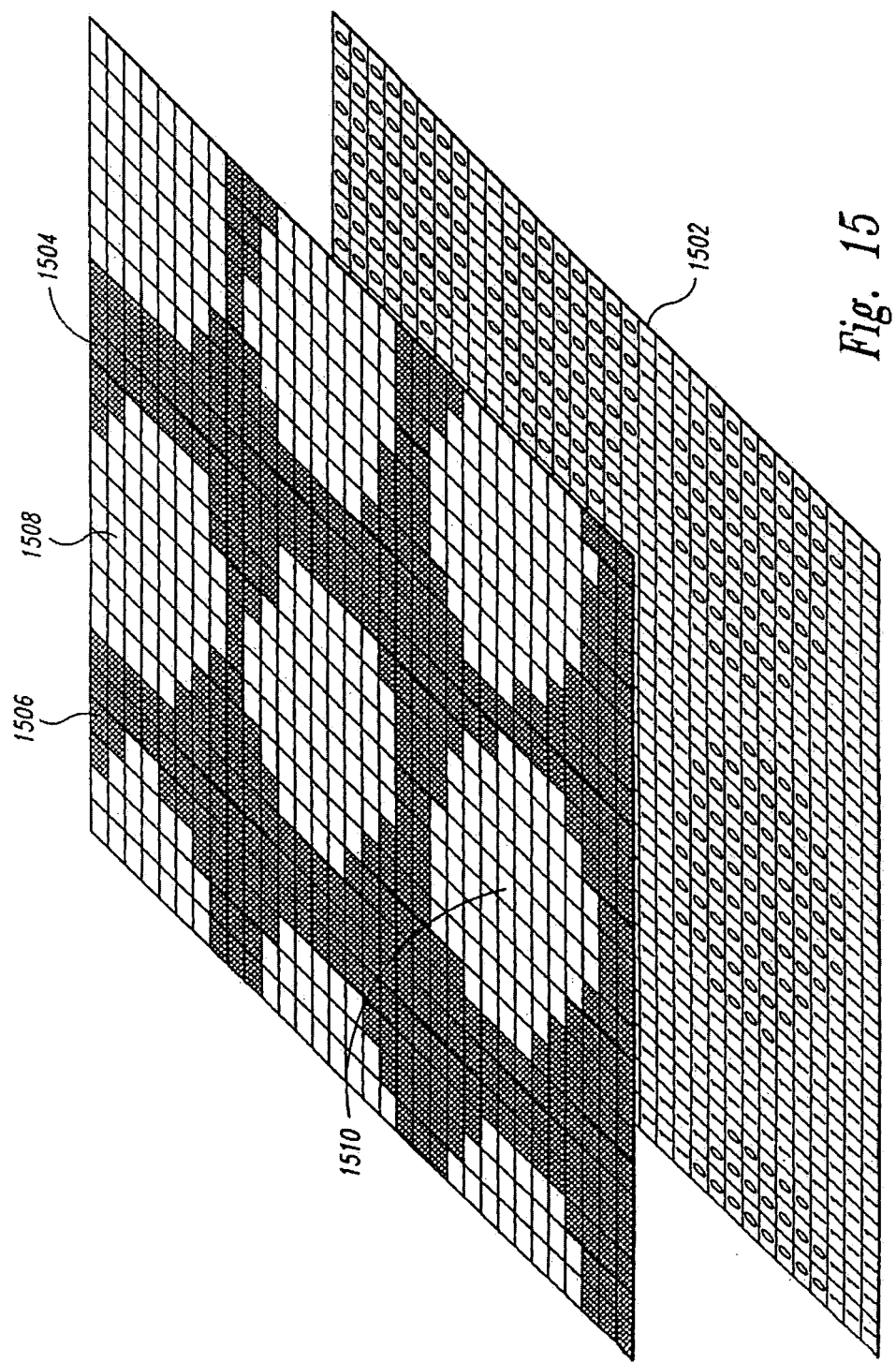

FIGS. 14 and 15 illustrate generation of a background mask which is subsequently used, in the described embodiment of the present convention, to distinguish background pixels from non-background pixels. The described embodiment employs a data set, generated by scanned, image-processing components of a molecular array scanner or a separate data processing system, that lists the positions, shapes, and sizes of features and feature ROIs detected in a scanned image of a molecular array. Using this data set, a two-dimensional array of binary elements, such as bits or Boolean variables, can be constructed to mirror the two-dimensional pixel array of the scanned image of the molecular array. For each pixel in the scanned image of the molecular array, a corresponding background-mask element contains one value to indicate that the corresponding pixel is a background pixel, and another value to indicate that the corresponding pixel a non-background pixel.

In FIG. 14, a small region of a scanned image of a molecular array 1402 containing a feature 1404 is shown logically positioned above a corresponding section of the background mask 1406 generated from the small region of the scanned image of the molecular array 1402. Using the known position, shape and size of the feature 1404, a computer program can determine, for each pixel in the scanned image of the molecular array 1402 whether the pixel lies completely or partially within the ROI enclosing the feature, or in the background region outside of the ROI of the feature. The computer program then sets the corresponding binary element in the background mask 1406 to indicate whether or not the pixel is a background pixel or a non-background pixel. For example, a computer program can determine that pixel 1408 is within the ROI of the feature, and sets the corresponding background mask binary element 1410 to the value of "0." By contrast, the computer program can determined that pixel 1412 falls outside the ROI of the feature, and therefore sets the binary element of the background mask 1414 corresponding to the pixel 1412 to the value "1," to indicate that the corresponding pixel 1412 is a background pixel.

The computer program initializes all binary elements of the background mask to the value "1" or, in the case of a Boolean background mask, the value "true." Then, the computer program considers, in turn, each feature in the data set and sets binary elements in the background mask corresponding to pixels within the ROI of the feature to the value "0" or "false." When all features have been considered by the computer program, a complete background mask is generated for the data set. FIG. 15 shows the background mask 1502 corresponding to a larger region of the molecular array logically positioned below the two-dimension array of pixels for that region in the scanned image of the molecular array 1504. Background regions are darkly colored 1506 in the in the scanned image of the molecular array, while feature and ROI regions are not colored, such as feature ROI region 1508. When the computer program subsequently considers a particular feature, such as the feature positioned at position 1510 in the scanned image of the molecular array in FIG. 15, the computer program can consult the background mask 1502 to determine whether a pixel in the neighborhood of the feature is a background pixel or a non-background pixel.

Figure 17:
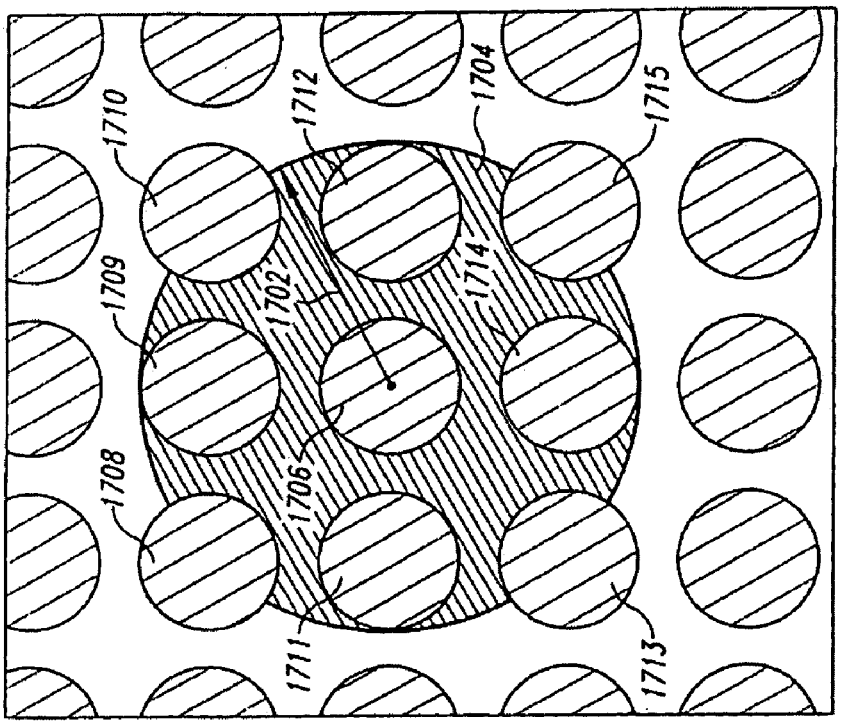
FIGS. 16–18 illustrate several background regions that can be arbitrarily specified and integrated by the technique of one embodiment of the present invention.
Figure 16:
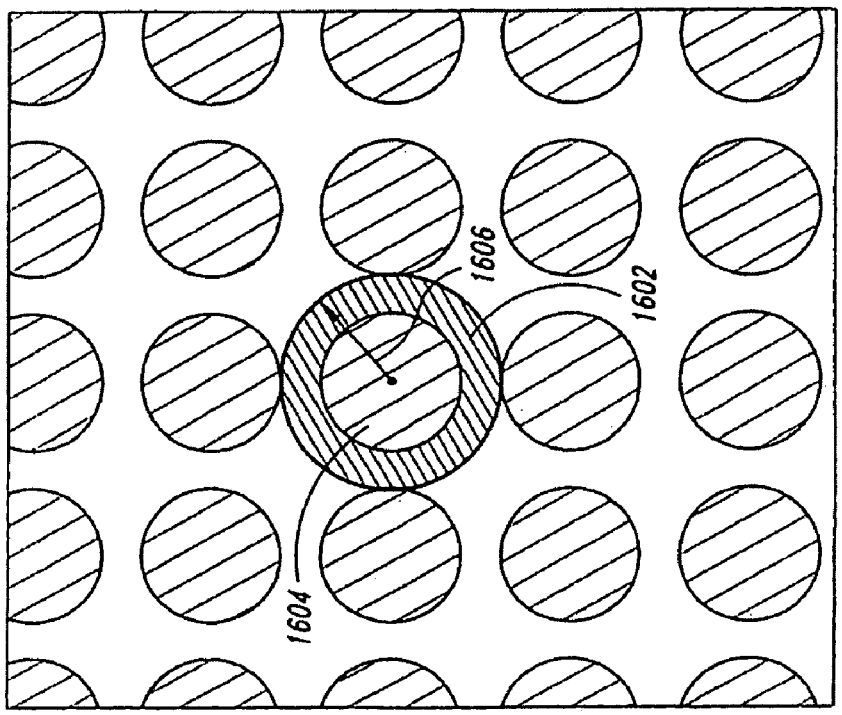
Figure 18:
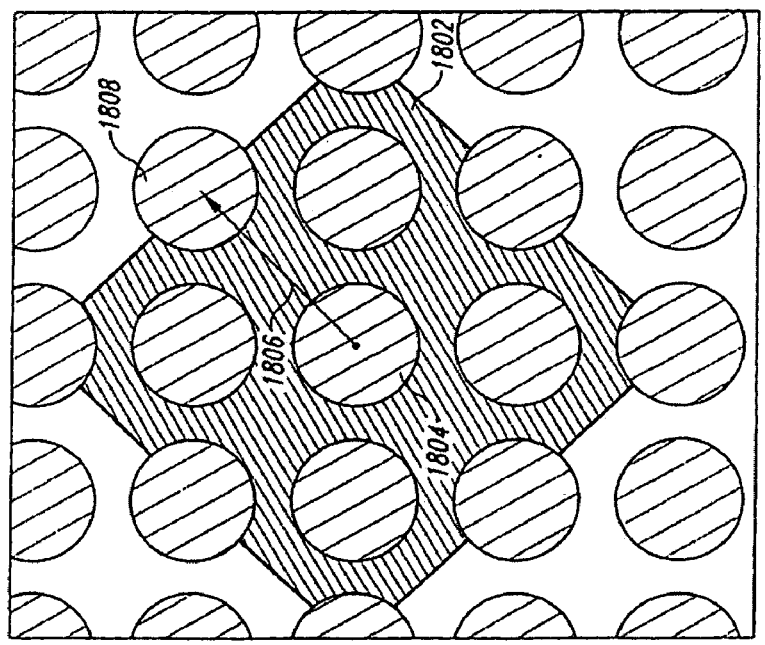

FIGS. 16–18 illustrate several background regions that can be arbitrarily specified and integrated by the technique of one embodiment of the present invention. In FIG. 16, a narrow, relatively local background region 1602 is specified around the ROI of a feature 1604 by specifying the outer radius 1606 of the background region 1602. In FIG. 16, the feature ROI and background are both assumed to be disc-shaped. The technique of one embodiment of the present invention can be used to enumerate the pixels within the specified background region 1602 and determine an average, integrated signal intensity over that region. It is also possible, using the techniques of one embodiment of the present invention, to calculate an average signal intensity over a much larger background centered on the feature position. In FIG. 17, a much larger radius 1702 is specified to generate a much larger background region 1704 about the ROI of a feature 1706. By using the background mask (1502 in FIG. 15), the computer program can easily generate a complex background region that excludes the ROIs of features neighboring the feature about which the background region is constructed in 1706. For example, the ROIs of neighboring features 1708–1715 have been excluded, by the computer program, from the background region 1704 specified by radius 1702 and the position of feature 1706. Without the background mask, it would be computationally inefficient and complex to generate an ROI-excluded background, such as the background region 1704 shown in FIG. 17. It should be noted that backgrounds of arbitrary shapes and sizes can be constructed using the techniques of the described embodiment of the present invention. For example, FIG. 18 shows a square background region 1802 surrounding a feature 1804. The square background region is specified by specifying the distance 1806 between the position of the future around which the background is calculated and the nearest diagonal feature, 1808. Again, the computer program uses the background mask to carve out, or exclude, neighboring feature ROIs from the square background region 1802.

The technique for computing integrated background signal intensities from arbitrarily specified background regions can be used to calculate estimated background signals for densely packed features, such as the densely packed features shown in FIG. 13B. Because the computer program can mask out non-background pixels, the close packing of features, as shown in FIG. 13B, presents no problem in selecting a background region of sufficient size in order to compute a statistically meaningful estimated background signal.

Figure 19:
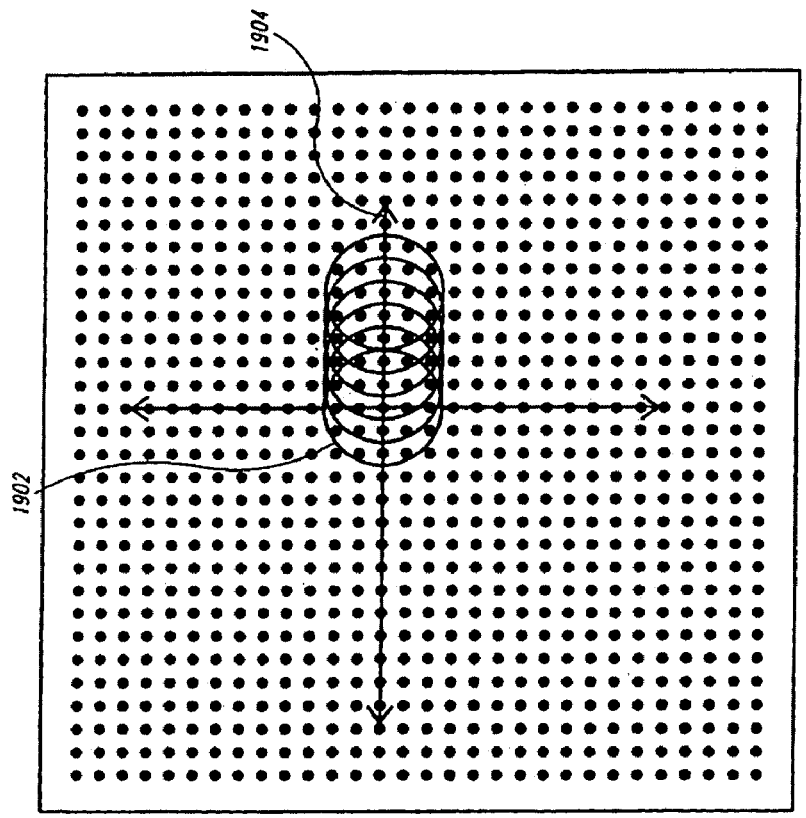
FIG. 19 illustrates calculation of background-signal intensities in a horizontal direction across a molecular array.

The method embodied in the described embodiment of the present invention can be used to compute background signals as a relatively continuous function of position across a molecular array, providing that sufficiently large background regions are specified for features so that background regions overlap with one another. For example, estimated background signals at different positions of a molecular array can be used to determine whether or not the background-signal intensity varies over the array. FIG. 19 illustrates calculation background-signal intensities in a horizontal direction across a molecular array. In FIG. 19, relatively large background regions, such as background region 1902, can be specified for successive features in a horizontal direction 1904 across a molecular array. Because the background regions overlap, the estimated background signals for the background regions plotted with respect to feature position provides a good approximation to a continuous function sampled as discrete positions along the molecular array. Moreover, the background regions can be chosen to be centered at any arbitrary pixel location, and may not be coincident with the centers or centroids of features. The ability to produce a close approximation to a continuous function can be contrasted to the situation when discrete, local backgrounds are employed, as illustrated in FIG. 13A. In that case, an estimated background signal is based on a relatively small, discrete region of the surface of the molecular array but does not overlap, and may not even be closely positioned to, the nearest background region in any particular direction. By computing a relatively continuous function of background-signal intensity with respect to position, the direction of greatest change in estimated background-signal intensity can be determined by standard mathematical techniques, and the gradient so determined can be employed to diagnose potential sources of background variation and to correct feature-signal intensities based on global or non-local background-signal-intensity variation over the surface of the molecular array.

Figure 20:
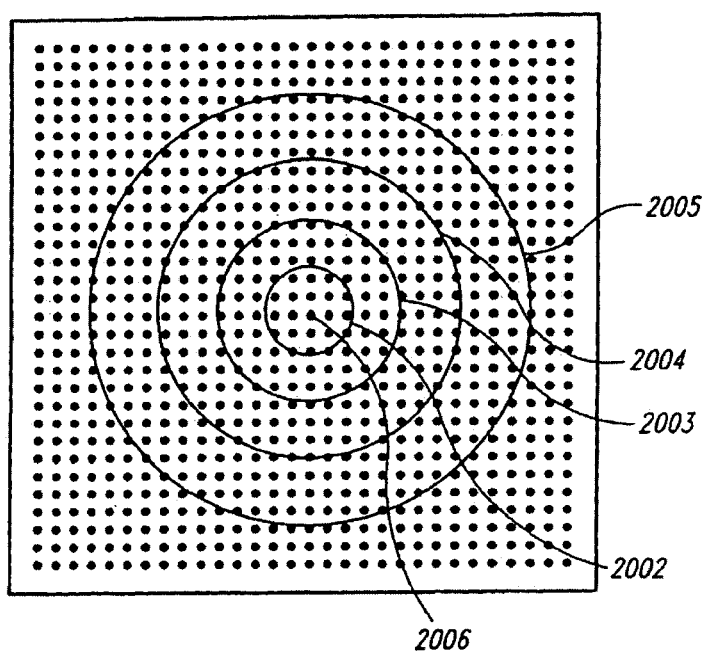
FIG. 20 illustrates a different technique for detecting non-local background-signal intensity variations on the surface of the molecular array.

FIG. 20 illustrates a different technique for detecting non-local background-signal intensity variations of the surface of the molecular array. In a technique illustrated in FIG. 20, the mean and median integrated background-signal intensities for background regions 2002–2005 computed about a particular feature 2006 are determined. The background-region radius at which the computed median and mean background-signal intensities begin to diverge corresponds to a measure of the distance across the surface of the molecular array at which the background-signal intensity noticeably varies. The described embodiment of the present invention permits estimation of background-signal intensities for arbitrarily-sized background regions, and thus permits a background-signal intensity-related measurement of non-local background-signal variation in a molecular array data set.

Figure 21:
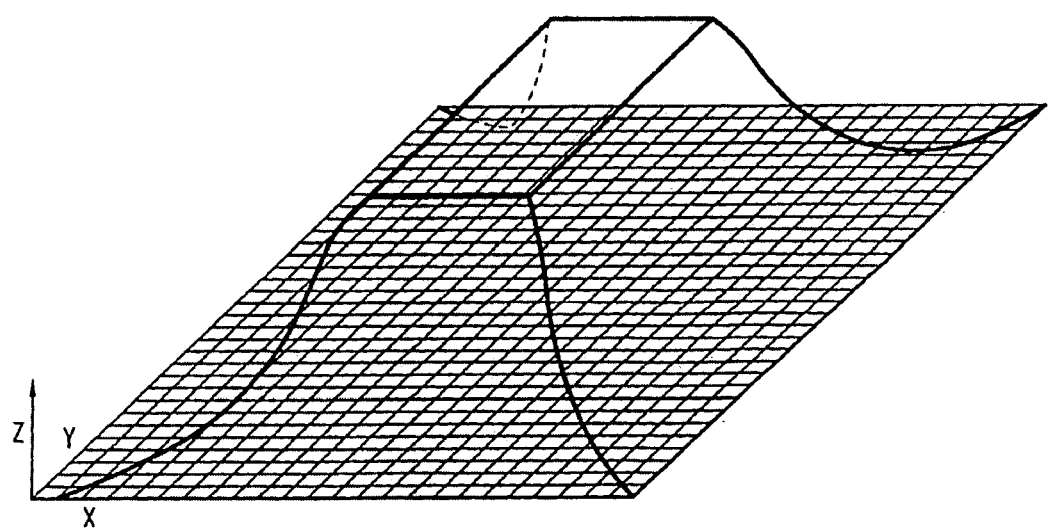
FIG. 21 illustrates a natural advantage that accrues from employing overlapping backgrounds in estimating background-signal intensities.

FIG. 21 illustrates a natural advantage that accrues from employing overlapping backgrounds in estimating background-signal intensities. When relatively large, overlapping background regions are used to compute background-signal intensities, the background regions of any particular area on the surface of the molecular array are sampled many times during computation of estimated background-signal intensities for neighboring features. Because interior features of the molecular array have, in general, a greater number of neighbors than features located toward the edge of the molecular array, the interior background regions are sampled more times than the background regions lying toward the edge of the molecular array. FIG. 21 illustrates a possible two-dimensional surface plot of the number of times a background region is sampled, along the z-axis, with respect to the position of the background region on the surface of the molecular array, on the xy-plane. As it turns out, the central pixels within a scanned image of a molecular array can be measured more precisely, and have lower variance, than signal intensities measured for outlying regions of the molecular array. Thus, using relatively large background regions for estimating background-signal intensities, the portions of the surface of the molecular array most intensely sampled coincide with those portions of the molecular array that provide the most accurate data.

C++-Like Pseudocode Implementation

The following C++-like pseudo-code implements one embodiment of the present invention. Implementation details for all but two constructor methods are provided to illustrate a working embodiment of the present invention. First, a number of standard C-library include files are employed in the present invention:
1 #include <stdio.h>
2 #include <stdarg.h>
3 #include <math.h>
4 #include <stdlib.h>

Next, a number of constant integer declarations are provided:
5 const int MaxNumChannels=12;
6 const int ImageRows=200;
7 const int ImageColumns=200;
8 const int DataSetRows=5;
9 const int DataSetColumns=5;

The constants "ImageRows" and "ImageColumns," declared above on lines 6–7, specify the maximum size, in pixels, for a two-dimensional scanned image. The constants "DataSetRows" and "DataSetColumns," declared above on lines 8 and 9, specify the maximum dimensions of the two-dimensional matrix storing a feature-based data set. Of course, actual scanned-image and data-set dimensions are generally much larger. The current C++-like pseudocode implementation is provided only to illustrate the background mask technique of one embodiment of the present invention applied to a simulated image and data set.

Next, the declaration of a structure containing the parameters that specify the location and size of a feature within a feature-based data set is provided:

```
1 struct feature
2 {
3     int centerPixelX;
4     int centerPixelY;
5     int pixelROIRadius;
6     int pixelFeatureRadius;
7     int integratedIntensity;
8 };
```

The structure members "centerPixelX" and "centerPixelY" specify the pixel-based coordinates for the center of the feature. In the current implementation, features are assumed to be disc-shaped. The structure members "pixelROIRadius" and "pixelFeatureRadius" specify the radii of the ROI and central, disc-shaped feature regions, respectively.

Next, a declaration for the class "Image" is provided:

```
1 class image
2 {
3   private:
4       int rows;
5       int columns;
6       short pixles[ImageRows][ImageColumns];
7
8   public:
9       short getPixel(int x, int y) {return pixles[x][y];};
10      void setPixel(int x, int y, short val) {pixles[x][y] = val;};
11      void getSize(int & r, int & c) {r = rows; c = columns;};
12      image(int r, int c);
13 };
```

The class "image" represents a pixel-based, scanned image of a molecular array. The data members "rows" and "columns," declared above on lines 4–5, specify the dimensions, in pixels, of the image. The data member "pixels," declared above on line 6, is a 2-dimensional array that stores the intensity values for the pixels in the scanned image of the molecular array. Three function members, declared above on lines 9–11, provide functions for getting and setting the intensity values of pixels of the scanned image specified by x and y coordinates. Finally, a constructor for the class "image" is declared on line 12. Details of the constructor are not provided, below, in the interest of brevity, and because the implementation is specific for other components of a molecular-array-data processing system outside the scope of the present invention.

Next, a declaration for the class "arrayData" is provided:

```
1 class arrayData
2 {
3   private:
4       int rows;
5       int columns;
```

```
6       feature features[DataSetRows][DataSetColumns];
7       image* img;
8   public:
9       short getPixel(int x, int y) {return img->getPixel(x, y);};
10      void setPixel(int x, int y, short val) {img->setPixel(x, y, val);};
11      void getPixelImageSize(int & r, int & c) {img->getSize(r, c);};
12      short getFeature(int i, int j) {return features[i][j].integratedIntensity;};
13      void setFeature(int i, int j, int val)
14          {features[i][j].integratedIntensity = val;};
15      void getFeatureImageSize(int & r, int & c) {r = rows; c = columns;};
16      void getPixelCenter(int i, int j, int & x, int & y)
17          {x = features[i][j].centerPixelX; y = features[i][j].centerPixelY;};
18      int     getPixelFeatureRadius(int i, int j)
19          {return features[i][j].pixelFeatureRadius;};
20      int     getPixelROIRadius(int i, int j)
21          {return features[i][j].pixelROIRadius;};
22      arrayData(int r, int c, image* imag);
23 };
```

An instance of the class "arrayData" represents a feature-based data set and pixel-based image produced by scanning a molecular array and initially processing the scanned image. The data members "rows" and "columns," declared above on lines 4–5, indicate the dimensions, and features, of the data set. The array member "features," declared above on line 6, stores a feature structure for each feature in the data set. Finally, the image pointer "img," declared above on line 7, references an instance of the class "image" that stores the pixel-based, scanned image of the molecular array. The class "arrayData" includes function members, declared above on lines 9–21, that provide pixel and feature-based information stored in the data members "features" and "img" to be accessed and stored based on feature coordinates i and j and on pixel coordinates x and y. For example, the function member "getFeatureImageSize," declared above on line 15, returns the size, in features, of the data set, while the function member "getPixelCenter," declared above on lines 16–17, returns the pixel-based coordinates for the feature specified by the feature coordinates i and j. The remaining function members are straightforward, and the underlying functionality of a function member is readily determined from the name of the function member. Implementation details of the constructor, declared above on line 22, are not provided, both in the interest of brevity, and because such details are highly implementation specific.

Next, the class "background" is declared:

```
1  class backGround
2  {
3    private:
4        arrayData* data;
5        bool mask[ImageRows][ImageColumns];
6        int minX, maxX, minY, maxY;
7        int minInnerY, maxInnerY;
8        int curX, curY, curRad;
9        int cnY, cnX;
10       int curROIRad;
11       int leftInnerX, rightInnerX;
12       bool moreXY;
13       void initBackGroundXY(int i, int j, int radius);
14       void incBackGroundXY( );
15       bool find BackGroundX( );
16       bool nxtBackGroundXY(int & x, int & y);
17   public:
18       short background(int i, int j, int radius);
19       backGround(arrayData* d);
20 };
```

The class "backGround" essentially implements the continuous, arbitrarily specified background-signal intensity calculation component that represents an embodiment of the present invention. The class "backGround" includes the following data members: (1) "data," declared above line 4, which references an instance of the class "arrayData;" (2) "mask," a two-dimensional array that stores Boolean values indicating whether corresponding pixels in a scanned image of a molecular array are background pixels or are non-background pixels, as described above; (3) "minX," "maxX," "minY," and "maxY," declared above on line 6, that store the minimum and maximum pixel ranges for an arbitrarily specified background region; (4) "minInnerY" and "maxInnerY," declared above on line 7, which store the pixel range of the ROI of a feature; (5) "curX," "curY," and "curRad," declared above on line 8, that store the coordinates of the next pixel in a background region, as well as the specified radius of a background region; (6) "cnY" and "cnX," declared above on line 9, that store the y and x coordinates of a feature position; (7) "curROIRad," declared above on line 10, which stores the radius of the ROI of a currently featured feature; (8) "leftInnerX" and "rightInnerX," declared above on line 11, which store the X-coordinate range of the ROI of a currently considered feature; and (9) "moreXY," declared above on line 12, that indicates whether additional pixels are contained in an arbitrarily specified background region. The class "backGround" includes the following private function members, declared above on lines 13–16: (1) "initBackGroundXY," which initializes background calculation for a feature specified by feature coordinates i and j with a background radius specified by argument "radius;" (2) "incBackGroundXY," which increments the background-pixel considered to be the current background-pixel; (3) findBackGroundX," which determines the left-most pixel in a currently considered row of pixels within the background region; and (4) "nxtBackGroundXY," which returns the next background pixel in an arbitrarily specified background region. The class "backGround" includes the following two public function members, declared above on lines 18–19: (1) "background," a function member that computes the average background-signal intensity over a background region for the feature with coordinates i and j having a background region with radius specified by the argument "radius;" and (2) "backGround," a constructor for an instance with the class "backGround."

Next, implementations for the function members of the class "backGround" are provided. First, an implementation for the function member "initbackGroundXY" is provided:

```
 1 void backGround::initBackGroundXY(int i, int j, int radius)
 2 {
 3   int imageR, imageC;
 4   data->getPixelImageSize(imageR, imageC);
 5   data->getPixelCenter(i, j, cnX, cnY);
 6   curRad = radius;
 7   curROIRad = data->getPixelROIRadius(i, j);
 8   maxY = cnY + curRad;
 9   curY = maxY;
10   if (maxY >= imageC) curY = imageC - 1;
11   minY = cnY - curRad;
12   if (minY < 0) minY = 0;
13   maxInnerY = cnY + curROIRad;
14   if (maxInnerY >= imageC) maxInnerY = imageC - 1;
15   minInnerY = cnY - curROIRad;
16   if (minInnerY < 0) minInnerY = 0;
17   while (!findBackGroundX( ) && curY >= minY) curY--;
18   if (curY < minY) moreXY = false;
19   else moreXY = true;
20 }
```

The function member "initbackGroundXY" initializes an instance of the class "backGround" to begin returning pixel coordinates of pixels within the background region for the feature specified by the feature coordinates i and j with radius "radius." The local variables "imageR" and "imageC" are initialized, on line 4, to the row and column sizes of the pixel-based image from which the background pixels will be extracted. The data members "cnX" and "cnY" are initialized, on line 5, to the pixel-based coordinates of the center of the feature for which the background pixels will be returned. The radius of the background is stored in the data member "curRad" on line 6. The radius of the ROI for the feature is stored in the data member "curROIRad" on line 7. On lines 8–12, the y-coordinate range for the background region is calculated, based on the radius of the background region and the y coordinates for the feature position. Note that this range is corrected, in the case that the range extends past the edge of the scanned image. Next, on lines 13–16, the y-coordinate range for the ROI of the feature is calculated and stored in data members "maxInnerY" and "minInnerY." On line 17, the function member "findBackGroundX" is called in order to find the x-coordinate of the left-most pixel in a row of pixels that pass through the current y coordinate stored in data member "curY." In general, the background region is scanned from maximum y coordinate to minimum y coordinate in a left-to-right, row-wise fashion. The function member "findBackGroundX" is repeatedly called until a first background pixel is identified. If no background pixels are identified, then the data member "moreXY" is set to "false," on line 18. Otherwise, data member "moreXY" is set to true, on line 19. Thus, at the end of function member "initBackGroundXY," a first pixel in the specified background region has been identified, and the data members "curX" and "curY" store the pixel-based coordinates of that first background pixel.

Next, an implementation for the function member "nxtBackGround XY" is provided:

```
 1 bool backGround::nxtBackGroundXY(int & x, int & y)
 2 {
 3   if (!moreXY) return false;
 4   else
 5   {
 6         x = curX;
 7         y = curY;
 8         incBackGroundXY( );
 9         return true;
10   }
11 }
```

This function member returns the next pixel in the background region, in the case that a next pixel has been identified, on lines 6–7, and then increments the data members "curX" and "curY," as needed, to identify the next available background-region pixel on line 8. If no more pixels can be obtained from the specified background region, then a return value of "false" is returned on line 3.

Next, an implementation for the function member "incBackGroundXY" is provided:

```
 1 void backGround::incBackGroundXY( )
 2 {
 3   int imageR, imageC;
 4
 5   data->getPixelImageSize(imageR, imageC);
 6   curX++;
 7   while ((!mask[curX][curY] || (curX >= leftInnerX && curX <= rightInnerX)) &&
 8       curX <= maxX) curX++;
 9   if (curX > maxX)
10   {
11       while (curY > minY)
12       {
13           curY--;
14           if (curY < minY)
15           {
16               moreXY = false;
17               return;
18           }
19           else if (findBackGroundX( )) break;
```

```
20    }
21  }
22 }
```

The function member "incBackGroundXY" increments the data member "curX" in order to select the next background pixel within the specified background region and, if necessary, increment data member "curX" and decrements dara member "curY." On line 6, data member "curX" is incremented by one. Then, on lines 7–8, data member "curX" is continuously incremented until a next valid background pixel is identified or until the end of the currently considered row of pixels is reached. Note that the background mask "mask" is checked to see if the currently considered pixel is a background pixel, and the position of the currently considered pixel is compared to the positions of pixels contained within the ROI of the feature. If no next background pixel can be found in the currently considered row of background pixels, as determined on line 9, then the data member "curY" is decremented, in the while-loop of lines 11–20, until either the y-coordinate range is exceeded, or a y coordinate within the range of the background region is found that specifies a row of pixels containing a valid background pixel, as determined by a call to the function member "findBackGroundX" on line 19.

Next, an implementation for the function member "findBackGroundX" is provided:

Finally, on line 24, the data member "curX" is incremented until a valid background pixel can be identified in the currently considered row. If a valid pixel is found, then "findBackGroundX" returns a value of "true" on line 27, and, otherwise, returns a value of "false" on line 26.

Next, an implementation for the function member "backGround" is provided:

```
1 short backGround::background(int i, int j, int radius)
2 {
3    int sum = 0;
4    int num = 0;
5    int x, y;
6    initBackGroundXY(i, j, radius);
7    while (nxtBackGroundXY(x, y))
8    {
9        sum += data->getPixel(x, y);
10       num++;
11   }
12   return sum / num;
13 }
```

```
1 bool backGround::findBackGroundX( )
2 {
3    double rowX;
4    int imageR, imageC;
5    data->getPixelImageSize(imageR, imageC);
6    rowX = ceil(sqrt((pow(curRad, 2) - pow(fabs(curY - cnY), 2))));
7    curX = cnX - rowX;
8    if (curX < 0) curX = 0;
9    maxX = cnX + rowX;
10   if (maxX >= imageR) maxX = imageR - 1;
11   if (curY <= maxInnerY && curY >= minInnerY)
12   {
13       rowX = ceil(sqrt((pow(curROIRad, 2) - pow(fabs(curY - cnY), 2))));
14       leftInnerX = cnX - rowX;
15       while (leftInnerX < 0) leftInnerX++;
16       rightInnerX >= cnX + rowX;
17       while (rightInnerX >= imageR) rightInnerX--;
18   }
19   else
20   {
21       leftInnerX = imageR + 1;
22       rightInnerX = leftInnerX + 1;
23   }
24   while ((!mask[curX][curY] || (curX >= leftInnerX && curX <= rightInnerX)) &&
25       curX <= maxX) curX++;
26   if (curX > maxX) return false;
27   else return true;
28 }
```

The function "findBackGroundX" attempts to find a valid background pixel in the row of pixels specified by the y coordinate stored in the data member "curY." First, one-half of the size of the row corresponding to the y coordinate "curY" is calculated on line 6. Using this value, stored in local variable "rowX," the maximum and minimum X-coordinates for pixels in the row are calculated and stored in data member "maxX" and "curX," respectively. Next, on lines 13–17, the x-coordinate range for the ROI for the currently considered row of pixels is calculated, if necessary.

The function member "backGround" calculates an average background-signal intensity over a specified background region. On line 6, the function member "initBackGroundXY" is called to initialize the return of background pixels. Then, in the while-loop of lines 7–11, the x and y coordinates of each valid background pixel within the specified background region are returned to enable the corresponding pixel intensities to be fetched, on line 9, and stored in the accumulator "sum." On line 12, the sum of the pixel intensities divided by the number of valid background pixels identified is returned as the average background-signal intensity.

Next, an implementation for the constructor for the class "backGround" is provided:

```
1   backGround::backGround(arrayData* d)
2   {
3       data = d;
4       int imageR, imageC;
5       int featuresR, featuresC;
6       int i, j;
7       int x, y;
8       int mx Y, mn Y;
9       double rowX;
10      data->getPixelImageSize(imageR, imageC);
11      data->getFeatureImageSize(featuresR, featuresC);
12      for (x = 0; x < imageR; x++)
13      {
14          for (y = 0; y < imageC; y++)
15          {
16              mask[x][y] = true;
17          }
18      }
19      for (i = 0; i < featuresR; i++)
20      {
21          for (j = 0; j < featuresC; j++)
22          {
23              data->getPixelCenter(i, j, cnX, cnY);
24              mxY = cnY + data->getPixelROIRadius(i, j);
25              mnY = cnY - data->getPixelROIRadius(i, j);
26              for (y = mxY; y >= mnY; y--)
27              {
28                  rowX =
                    ceil(sqrt((pow(data->getPixelROIRadius(i, j), 2)
29                          pow(fabs(y - cnY), 2))));
30                  for (x = cnX - rowX; x <= cnX + rowX; x++)
31                  {
32                      mask[x][y] = false;
33                  }
34              }
35          }
36      }
37  }
```

The constructor "backGround" initializes the data member "data" on line 3, and then proceeds to construct the background mask. First, in the for-loop of lines 12–18, all Boolean elements of the background mask "mask" are set to the value "true." Next, in the nested for-loops of lines 19–36, each feature in the data set is considered, and the pixels in the background mask corresponding to all pixels within the ROI for the each considered feature are set to the Boolean value "false" on line 32.

Finally, an implementation for a main routine is provided:

```
1   int main(int argc, char* argv[])
2   {
3       int i, j;
4       int res;
5       image* im = new image(200, 200);
6       arrayData* ad = new arrayData(5, 5, im);
7       backGround* bg = new backGround(ad);
8       for (i = 0; i < 5; i++)
9       {
10          for (j = 0; j < 5; j++)
11          {
12              res = bg->background(i, j, 12);
13              printf ("%d\n", res);
14          }
15      }
16      return 0;
17  }
```

In the main routine, instances of the classes "image" and "arrayData" are allocated, on lines 5–6, and the instance of the class "arrayData" is used to allocate an instance of the class "background" on line 7. In the nested for-loops of lines 8–15, the average background-signal for background regions for each feature in the data set represented by the instance of the class "arrayData" is determined, via a call to the function member "background" on line 12.

The above C++-like pseudocode implementation is but one of an almost limitless number of implementations that can be constructed for various embodiments of the present invention. This implementation is provided as an illustrious example, and is not intended to in any way limit the scope of the present invention.

Although the present invention has been described in terms of a particular embodiment, it is not intended that the invention be limited to this embodiment. Modifications within the spirit of the invention will be apparent to those skilled in the art. For example, although the above-described implementations focused on disc-shaped and elliptical feature, feature ROI, and background regions, the technique of the present invention can be employed to construct and integrate intensities over arbitrarily sized and shaped background regions. Very complex background region shapes may be generated based on pixel intensities, for example, or on other parameters and constraints. The background mask may be implemented as a bit mask, a Boolean-value mask, or in any number of other ways, including storing the background flags and integers, characters, or other data types. The method of the present invention can be practiced on scanned images and data sets corresponding to any of various signals generated by scanning a molecular array, or may be practiced on combined-signal logical images and combined-signal data sets. Many different data processing tools and components can employ the method of the present invention, not only for determining background-signal variation gradients, as discussed above, but also for quality control purposes in the manufacture of molecular arrays and design of molecular-array-based experiments, molecular array scanner quality control and calibration, and for other such purposes. Indeed, the background-signal variation gradients themselves may be employed for quality control purposes in the manufacture of molecular arrays and design of molecular-array-based experiments, molecular array scanner quality control and calibration, and for other such purposes. For example, background or other gradients may be determined and compared against standard or expected gradient ranges, and, if the observed gradients fall outside the standard or expected ranges, molecular arrays exceeding or failing to meet standards or expectations may be rejected or remanufactured, scanners producing data with observed gradients falling outside the standard or expected range may be recalibrated, adjusted, or partially remanufactured, and molecular array experiments producing data with observed gradients falling outside the standard or expected range may be redesigned or repeated.

Figure 22:
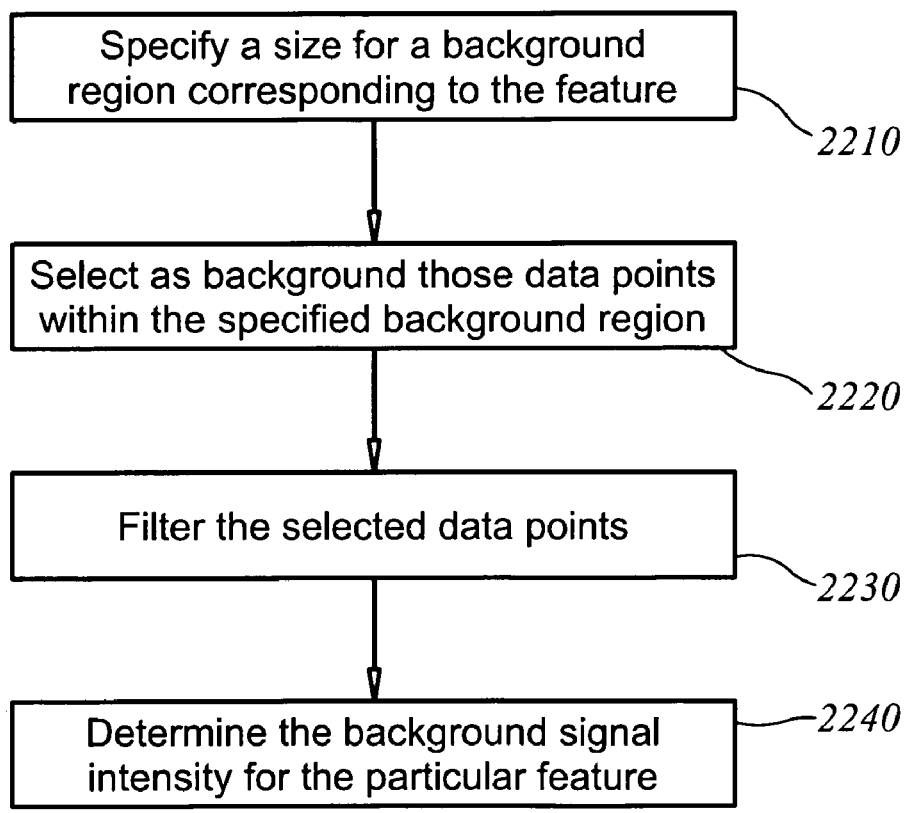
FIG. 22 illustrates a flow chart showing steps that may be carried out in an embodiment of a method described herein.

FIG. 22 illustrates a flow chart showing steps that may be carried out in an embodiment of a method for determining a background signal intensity for a particular feature from a representation of scanned intensity values of a molecular array according to the present invention. The particular feature is represented in a representation of scanned intensity values of a molecular array comprising data points and containing discrete features, each feature having a region of interest containing a number of data points. At step 2210, a size for a background region corresponding to the feature is specified. At step 220, those data point within the specified background region are selected as background. At step 2230, the data points are filtered to remove all data points that lie within specified locations of features and at least one region of interest of features in the region of specified size for the background region. At step 2240, the background signal intensity is determined for the particular feature from the filtered, selected data points, wherein background-subtraction of data points from the particular feature using the determined background signal intensity facilitates calculation of accurate and reproducible log ratios between at least one of multi-channel and inter-array data.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for determining a background signal intensity for a particular feature from a representation of scanned intensity values of a molecular array comprising data points and containing discrete features at specified locations, each feature having a region of interest containing a number of data points, the method comprising:
   specifying a size for a background region corresponding to the feature;
   selecting as background data points those data points within the specified background region;
   filtering the selected data points to remove all data points that lie within specified locations of features and at least one region of interest of features in the region of specified size for the background region; and
   determining the background signal intensity for the particular feature from the filtered, selected data points, wherein background-subtraction of data points from the particular feature using the determined background signal intensity facilitates calculation of accurate and reproducible log ratios between at least one of multi-channel and inter-array data.

2. The method of claim 1 further including:
   preparing a background mask with elements, corresponding to data points scanned from the molecular array, containing indications of whether or not corresponding data points are background data points.

3. The method of claim 2 wherein preparing a background mask with elements, corresponding to data points scanned from the molecular array, indicating whether or not corresponding data points are background data points further includes:
   allocating a number of background-mask elements;
   storing a background-data-point indication in each of the number of elements; and
   for each feature of the molecular array,
      for each data point within a region of interest for the feature,
         storing a non-background-data-point indication in a corresponding background-mask element.

4. The method of claim 2 wherein filtering the selected data points to remove data points that lie within regions of interest of features of the molecular array near the feature further includes:
   identifying as non-background data points those selected data points for which corresponding background-mask elements contain non-background-data-point indications.

5. The method of claim 4 wherein identifying as non-background data points those data points for which corresponding background-mask elements contain non-background-data-point indications further includes:
   for each selected data point in the set of potential background data points,
      identifying the data point as a non-background data point when the corresponding background mask element contains a non-background-data-point indication.

6. The method of claim 2 wherein background-mask elements are bits.

7. The method of claim 2 wherein background-mask elements are memory-storage units suitable for storing Boolean values.

8. The method of claim 1 wherein specifying a corresponding background region further includes specifying a radius for a background-region annulus and a feature having a region of interest surrounded by the background-region annulus.

9. The method of claim 1 wherein specifying a corresponding background region further includes specifying a size and a shape for the background region and a feature surrounded by the background region.

10. The method of claim 1 wherein specifying a corresponding background region further includes specifying a size, a shape, and a position for the background region.

11. The method of claim 1 wherein specifying a corresponding background region further includes specifying a size for the background region.

12. The method of claim 1 wherein specifying a corresponding background region further includes specifying a shape and a position for the background region.

13. The method of claim 1 wherein data points are pixel intensity values associated with pixels in the scanned image of a molecular array.

14. A method of analyzing a feature from a representation of scanned intensity values of a molecular array comprising data points and containing discrete features, said method comprising:
   accessing a representation of a background-corrected data set produced by subtracting from feature intensities background signal intensities using the method of claim 1, that has been maintained for subsequent analysis by one of: storing the representation of the background-corrected data set in a computer-readable medium, and transferring the representation of the background-corrected data set to an intercommunicating entity via electronic signals; and analyzing signal intensity of the feature based at least in part on the background signal intensity determined for the particular feature from the filtered, selected data points.

15. The method of claim 1, wherein said data points that lie within said regions of interest of features of the molecular array near the feature are removed regardless of signal intensity levels of said data points that lie within said regions of interest.

16. The method of claim 1, wherein all data points that lie with said regions of interest of features of the molecular array near the feature are removed.

17. A computer readable medium carrying one or more sequences of instructions for determining a background signal intensity for a particular feature from a representation of scanned intensity values of a molecular array comprising data points and containing discrete features at specified locations, each feature having a region of interest containing a number of data points, wherein execution of one or more sequences of instructions by one or more processors causes the one or more processors to perform the steps of:

selecting as background data points those data points within a specified background region;

filtering the selected data points to remove all data points that lie within specified locations of features and at least one region of interest of features in the region of specified size for the background region; and determining the background signal intensity for the particular feature from the filtered, selected data points, wherein background-subtraction of data points from the particular feature using the determined background signal intensity facilitates calculation of accurate and reproducible log ratios between at least one of multi-channel and inter-array data.

18. The method of claim 1, wherein background signal intensities calculated are used to:

evaluate operation of a molecular array scanner;

calibrate a molecular array scanner;

evaluate the quality of a molecular array; and/or evaluate the reproducibility of a molecular-array-based experiment.

19. A method according to claim 1 wherein the background signal intensity is communicated to a remote location.

20. A molecular-array-data processing system comprising:

a computer processor;

a communications medium by which molecular array data points are received by the molecular-array-data processing system;

one or more memory components that store molecular array data points; and a program, stored in the one or more memory components and executed by the computer processor to perform the following steps receiving specified location of features;

specifying a size for a background region corresponding to the feature;

selecting as background data points those data points within the specified background region;

filtering the selected data points to remove all data points that lie within specified locations of features and at least one region of interest of features in the region of specified size for the background region; and determining the background signal intensity for the particular feature from the filtered, selected data points, wherein background-subtraction of data points from the particular feature using the detennined background signal intensity facilitates calculation of accurate and reproducible log ratios between at least one of multi-channel and inter-array data.

21. The molecular-array-data processing system of claim 20 wherein the program prepares a background mask with elements, corresponding to data points scanned from the molecular array, containing indications of whether or not corresponding data points are background data points and identifies as non-background data points those selected data points for which corresponding background-mask elements contain non-background-data-point indications.

22. A method for determining a background signal intensity for a particular feature from a representation of scanned intensity values of a molecular array comprising data points and containing discrete features at specified locations, each feature having a region of interest containing a number of data points represented by pixel intensity values associated with pixels in a scanned image of the molecular array, the method comprising:

specifying size for a background region corresponding to the feature;

selecting as background pixels those pixels within the specified background region;

filtering the selected pixels to remove all pixels that lie within specified location of features and at least one region of interest of features in the region of specified size for the background region; and determining the background signal intensity for the particular feature from the filtered, selected pixels, wherein background-subtraction of pixels from the particular feature using the determined background signal intensity facilitates calculation of accurate and reproducible log ratios between at least one of multi-channel and inter-array data.

23. The method of claim 22, wherein the size of the background region specified includes regions of interest of more than one feature.

* * * * *